United States Patent
Ishihara

(10) Patent No.: US 11,294,186 B2
(45) Date of Patent: Apr. 5, 2022

(54) DISPLAY APPARATUS AND HEAD MOUNTED DISPLAY

(71) Applicant: CANON KABUSHIKI KAISHA, Tokyo (JP)

(72) Inventor: Keiichiro Ishihara, Ageo (JP)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 16/890,814

(22) Filed: Jun. 2, 2020

(65) Prior Publication Data
US 2020/0292827 A1    Sep. 17, 2020

Related U.S. Application Data

(63) Continuation of application No. PCT/JP2018/044231, filed on Nov. 30, 2018.

(30) Foreign Application Priority Data

Dec. 7, 2017   (JP) .............................. JP2017-235481

(51) Int. Cl.
*G02B 27/01* (2006.01)
*F21V 8/00* (2006.01)

(52) U.S. Cl.
CPC ....... *G02B 27/0172* (2013.01); *G02B 6/0055* (2013.01)

(58) Field of Classification Search
None
See application file for complete search history.

(56) References Cited

U.S. PATENT DOCUMENTS

| 2010/0253769 A1* | 10/2010 | Coppeta ................. G02B 30/24 348/58 |
| 2015/0279114 A1* | 10/2015 | Yonekubo ............. G06T 19/006 345/633 |

FOREIGN PATENT DOCUMENTS

| JP | 2003-520984 A | 7/2003 |
| JP | 2005-521099 A | 7/2005 |
| JP | 2010-243880 A | 10/2010 |
| JP | 2010-533316 A | 10/2010 |
| JP | 2016-180934 A | 10/2016 |
| JP | 2017-181537 A | 10/2017 |
| WO | 2007/029034 A1 | 3/2007 |
| WO | 2015/076335 A1 | 5/2015 |

* cited by examiner

*Primary Examiner* — Duane N Taylor, Jr.
(74) *Attorney, Agent, or Firm* — Canon U.S.A., Inc. I.P. Division

(57) ABSTRACT

A display apparatus includes: a guide element including a first part guiding light from the incident optical system in first direction and a second part guiding the light from the first part in second direction intersecting with the first direction; and an incident optical system. The first part has a first mirrors guiding the light to the second propagation part by reflection. The second part has a second mirror set causing the light to exit in third direction from the light element by reflection. The first part has a first reflection surface facing the first mirrors. The second part has a second reflection surface facing the second mirrors. The incident optical system causes the light coming from the display element to enter the first part obliquely with respect to the second and third directions. The first mirrors are disposed between the first reflection surface and the second part.

16 Claims, 12 Drawing Sheets

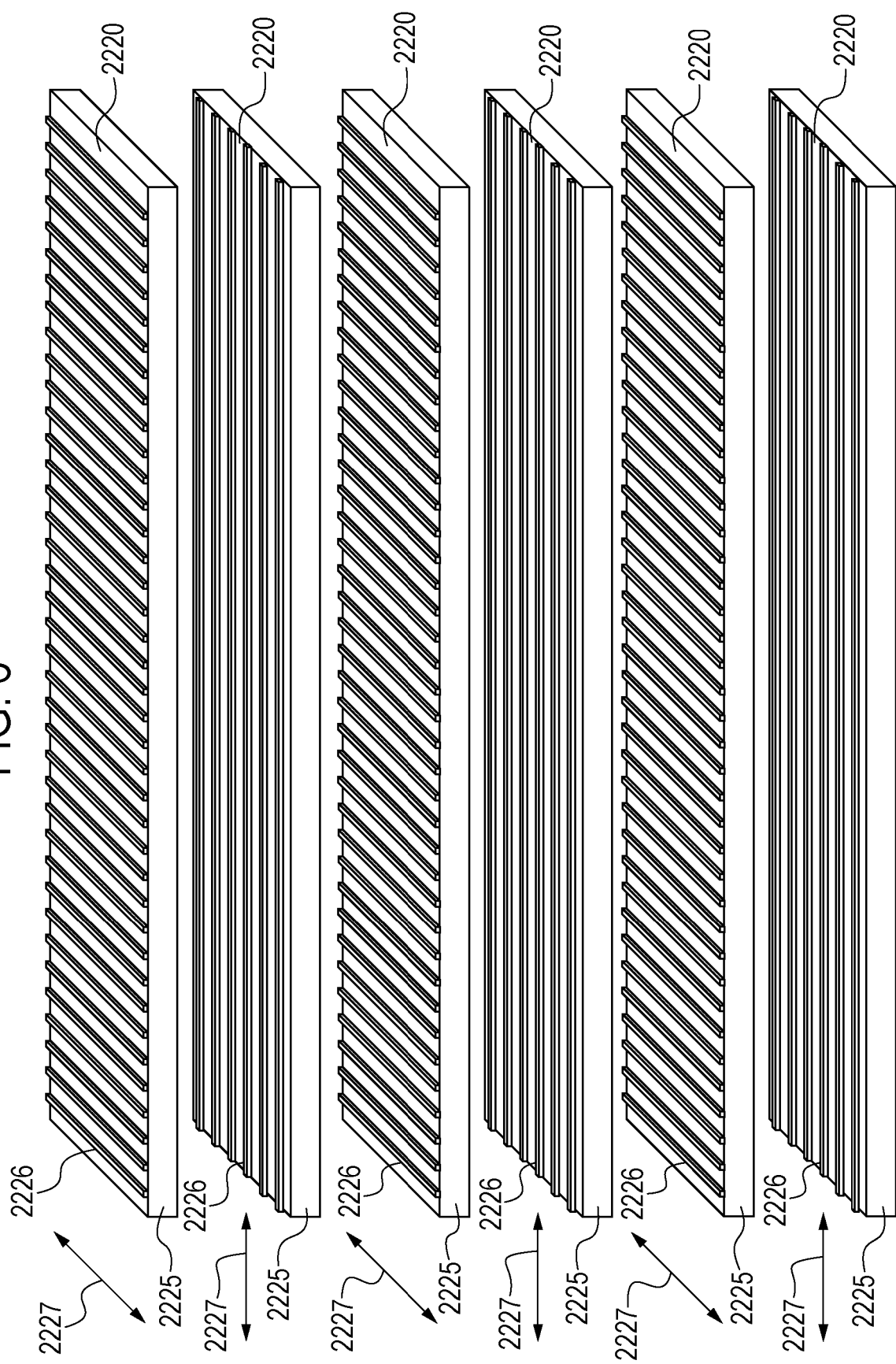

DISPLAY APPARATUS AND HEAD MOUNTED DISPLAY

CROSS-REFERENCE TO RELATED APPLICATIONS

This application is a Continuation of International Patent Application No. PCT/JP2018/044231, filed Nov. 30, 2018, which claims the benefit of Japanese Patent Application No. 2017-235481, filed Dec. 7, 2017, both of which are hereby incorporated by reference herein in their entirety.

BACKGROUND OF THE INVENTION

Field of the Invention

The present invention relates to a display apparatus and a head mounted display and, more specifically, to a display apparatus using a light guide plate.

Description of the Related Art

A display apparatus using a light guide plate guides light emitted from a display element to a viewer's eye with the light guide plate and displays an image to the viewer's eye.

Japanese Patent Application Laid-Open No. 2005-521099 describes a display apparatus that displays an image for a viewer's eye by enclosing light coming from a display element within a planar substrate and outputting the light with a plurality of mirrors disposed in the planar substrate.

Japanese Patent Application Laid-Open No. 2010-533316 describes a display apparatus that displays an image toward a viewer's eye by enclosing light coming from a scanning beam image source within a planar substrate and outputting the light with a mirror set disposed under the planar substrate.

Japanese Patent Application Laid-Open No. 2003-520984 describes that the width of each of deflected beams is increased with a mirror having a plurality of regions with different reflectances.

Japanese Patent Application Laid-Open No. 2005-521099 and Japanese Patent Application Laid-Open No. 2010-533316 describe display apparatuses that expand the width of each beam in one-dimensional direction in details; however, they do not describe display apparatuses that expand the width of each beam in two-dimensional directions in details.

International Publication No. WO2015/076335 describes a display apparatus that expands the width of each beam in two-dimensional directions; however, the configuration of the display apparatus, different from those of Japanese Patent Application Laid-Open No. 2005-521099 and Japanese Patent Application Laid-Open No. 2010-533316, outputs light with a mirror set disposed on a planar substrate, so a light quantity loss increases with this configuration.

SUMMARY OF THE INVENTION

The present invention provides a display apparatus that expands the width of a beam in two-dimensional directions with a reduced light quantity loss.

A display apparatus according an aspect of the present invention includes a light guide element and an incident optical system configured to cause light coming from a display element to enter the light guide element. The light guide element includes a first light guide part configured to guide the light coming from the incident optical system in a first direction and a second light guide part configured to guide the light coming from the first light guide part in a second direction intersecting with the first direction. The second light guide part has a second mirror set configured to output the light in a third direction from the light guide element by reflecting the light. The third direction intersects with the first direction and the second direction. The first light guide part has a first reflection surface facing the first mirror set. The second light guide part has a second reflection surface facing the second mirror set. The incident optical system is configured to cause the light coming from the display element to enter the first light guide part obliquely with respect to the second and third directions such that the light is reflected by the first reflection surface of the first light guide part and the second reflection surface of the second light guide part. The first mirror set is disposed between the first reflection surface and the second light guide part.

Other aspects of the present invention become apparent from embodiments that will be described below.

Further features of the present invention will become apparent from the following description of exemplary embodiments with reference to the attached drawings.

BRIEF DESCRIPTION OF THE DRAWINGS

FIG. 6 is a diagram that illustrates vertical output mirrors of the first embodiment to which the present invention is applicable.

DESCRIPTION OF THE EMBODIMENTS

Hereinafter, embodiments of the present invention will be described with reference to the attached drawings.

First Embodiment

A display apparatus of a first embodiment which the present invention is applicable will be described.

Figure 1:
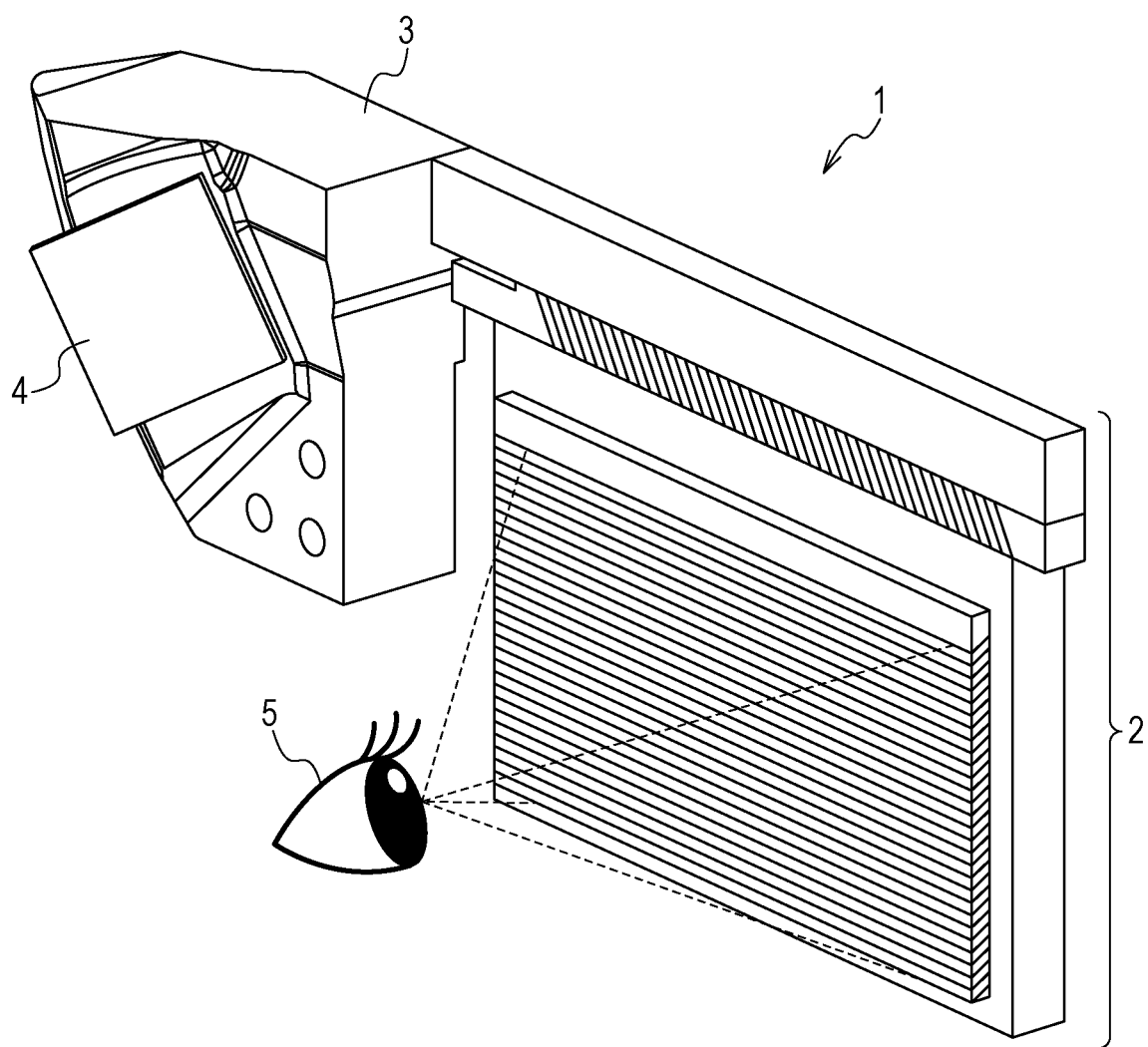
FIG. 1 is a perspective view of a display apparatus of a first embodiment to which the present invention is applicable.

FIG. 1 shows the display apparatus of the first embodiment to which the present invention is applicable.

The display apparatus 1 includes the light guide plate (light guide element) 2, the incident optical system 3, and the display element 4.

Diverging beams emitted from the display element 4 are converted to parallel beams by the incident optical system 3 and coupled to an incident surface of the light guide plate 2. The coupled beams propagate inside the light guide plate 2, then exit from an exit surface of the light guide plate 2, and enter the viewer's eye 5. In this way, the display apparatus 1 of the present embodiment is a display apparatus that is able to display images (including video) to the viewer's eye 5 when the viewer puts the eye 5 at a predetermined position on the exit surface side of the light guide plate 2. Examples of the display element 4 include a transmissive liquid crystal display (LCD), a reflective liquid crystal display (LCOS), a digital mirror device (DMD), an organic electroluminescence (OLED) display, and a spatial light modulation apparatus (SLM).

Figure 2:
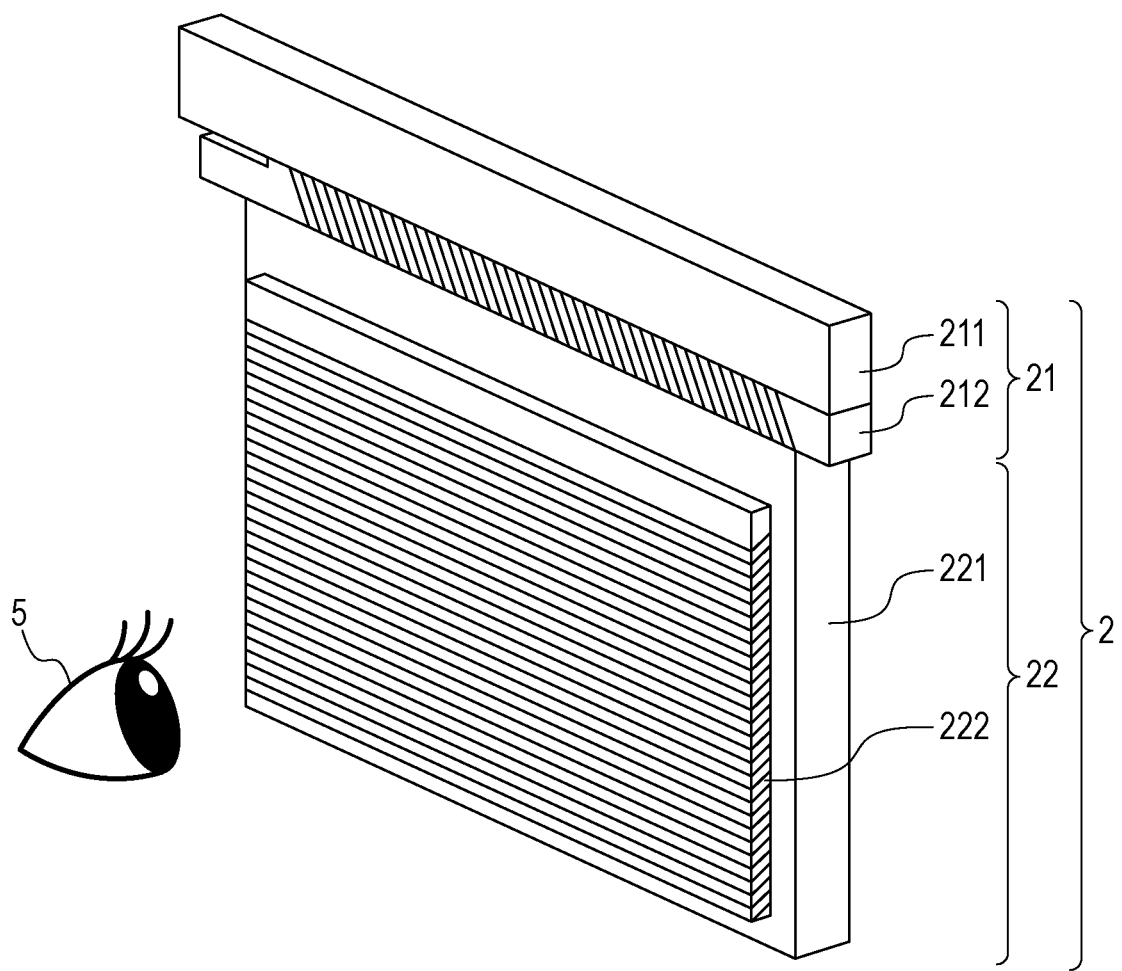
FIG. 2 is a perspective view of a light guide plate of the first embodiment to which the present invention is applicable.

FIG. 2 shows the light guide plate of the present embodiment.

The light guide plate 2 of the present embodiment has the horizontal light guide part 21 through which beams propagate inside the light guide plate 2 in a horizontal direction (first direction) and the vertical light guide part 22 through which beams propagate inside the light guide plate 2 in a vertical direction (second direction). The horizontal light guide part 21 has the horizontal propagation part 211 and the horizontal mirror set 212. The horizontal mirror set 212 is disposed on the lower side of the horizontal propagation part 211. The vertical light guide part 22 has the vertical propagation part 221 and the vertical mirror set 222. The vertical mirror set 222 is disposed on a side of the vertical propagation part 221, on which the viewer's eye 5 is placed. The horizontal light guide part 21 is coupled to the vertical light guide part 22 by placing the vertical propagation part 221 on the lower side of the horizontal mirror set 212. Thus, the light guide plate 2 is formed.

Figure 3A:
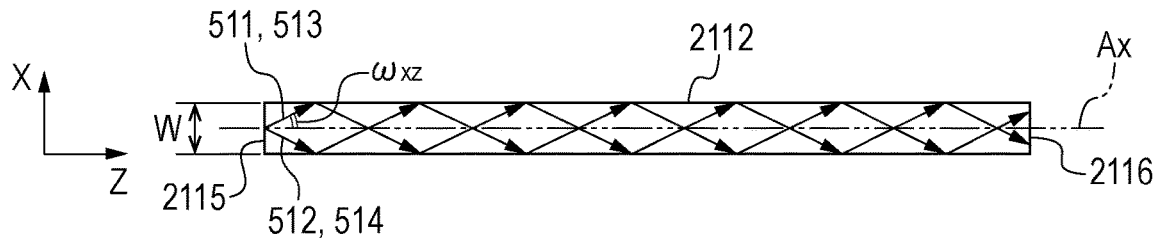
FIG. 3A is a diagram that illustrates a horizontal light guide part of the first embodiment to which the present invention is applicable.
Figure 3B:
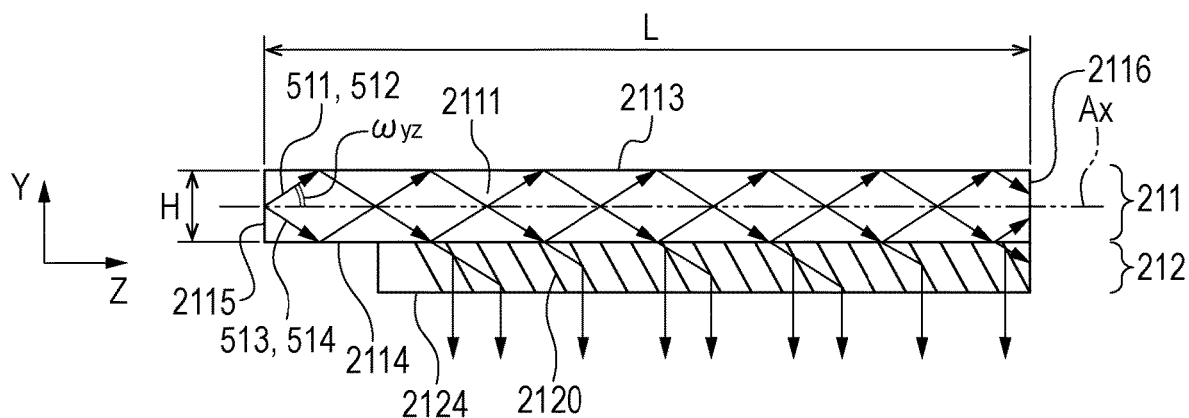
FIG. 3B is a diagram that illustrates the horizontal light guide part of the first embodiment to which the present invention is applicable.
Figure 3C:
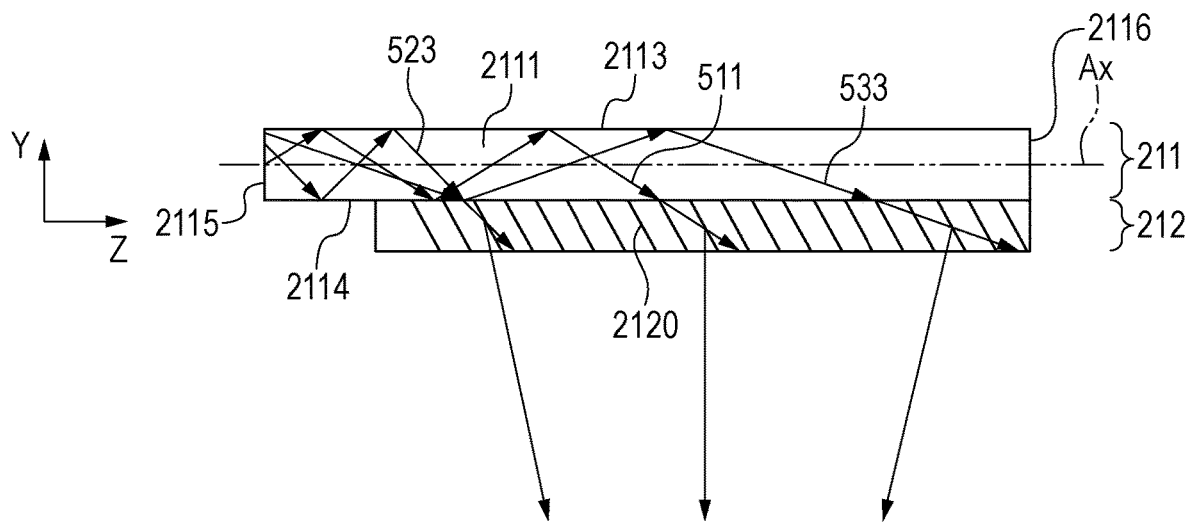
FIG. 3C is a diagram that illustrates the horizontal light guide part according to the first embodiment of the present invention.

FIG. 3A is a top view of the horizontal light guide part. FIG. 3B and FIG. 3C each are a front view of the horizontal light guide part.

FIG. 3A and FIG. 3B also show how beams that pass through the center of an angle of view (beams that exit parallel to an X direction from the light guide plate), that is, beams at the center of the angle of view, for the viewer's eye propagate inside the horizontal light guide part.

Beam propagation inside the horizontal light guide part will be described with reference to FIG. 3A and FIG. 3B.

The horizontal light guide part 21 includes the horizontal propagation part 211 and the horizontal mirror set 212. The horizontal light guide part 21 is formed by joining part of the bottom surface 2114 of the horizontal propagation part 211 with a top surface of the horizontal mirror set 212. At this joint surface, that is, between the horizontal propagation part 211 and the horizontal mirror set 212, a transmissive reflection film that passes part of incident beams and reflects part of the beams is disposed.

The horizontal propagation part 211 is a cube having a front surface 2111, a rear surface 2112, the top surface 2113, the bottom surface 2114, a left surface 2115, and a right surface 2116. Where the length is L, the height is H, and the width is W, the length L is the greatest, the height H is the second greatest, and the width W is the least. The horizontal propagation part 211 is a cuboid having a long side in a horizontal direction (Z-axis direction) and is disposed such that the top surface 2113 faces in a Y direction where the vertical light guide part 22 is disposed. The horizontal mirror set 212 is disposed so as to face the top surface 2113 (first reflection surface) of the horizontal propagation part 211.

The left surface 2115 of the horizontal propagation part 211 is used as an incident surface, and beams coming from the incident optical system (not shown) enter from the incident surface. A region of the bottom surface 2114 (first exit surface) of the horizontal propagation part 211, joined with the horizontal mirror set 212, is used as an exit region, and light having passed through at least part of the horizontal propagation part 211 exits from the exit region. Beams at the center of the angle of view of incident beams enter the horizontal propagation part 211 at four angles, that is, ±26 degrees in an X-Z cross-sectional direction and ±32 degrees in a Y-Z cross-sectional direction, with respect to an axis (long axis) Ax of the horizontal propagation part 211 in the longitudinal direction and become propagating beams inside the horizontal light guide part 21. The reason why beams at the center of the angle of view enter at four angles with positive and negative inclinations in each of the X-Z cross-sectional direction and the Y-Z cross-sectional direction will be described in detail later with reference to FIG. 9A and FIG. 9B of a second embodiment. The reason will be simply described here. Planar parts (not shown) respectively parallel to the rear surface 2112 and the top surface 2113 are provided at a connection part 32 of the incident optical system 3, connected to the horizontal light guide part 21. A beam that is internally reflected by the planar parts and enters the horizontal light guide part 21 and a beam that is not internally reflected by the planar parts and enters the horizontal light guide part 21 appear in each of the X-Z cross-sectional direction and the Y-Z cross-sectional direction, so beams enter at four angles. In the present embodiment, the incident optical system 3 and the horizontal light guide part 21 are made of the same material, and, inside the horizontal light guide part 21, propagating beams have angles of ±26 degrees in the X-Z cross-sectional direction and ±32 degrees in the Y-Z cross-sectional direction with respect to the long axis Ax. At this time, the angles that the propagating beams make with respect to the long axis Ax are termed X-Z propagation angles in the X-Z cross-sectional direction and Y-Z propagation angles in the Y-Z cross-sectional direction.

In FIG. 3A, propagating beams 511, 513 are beams having an X-Z propagation angle of +26 degrees, propagating beams 512, 514 are beams having an X-Z propagation angle of −26 degrees, and those propagating beams repeat total reflection on the front surface 2111 and the rear surface 2112 and reach the right surface 2116.

In FIG. 3B, the propagating beams 511, 512 are beams having a Y-Z propagation angle of +32 degrees, the propagating beams 513, 514 are beams having an X-Z propagation angle of −32 degrees, and those propagating beams repeat total reflection on the top surface 2113 and reflection on the bottom surface 2114 and reach the right surface 2116.

In this way, propagating beams at all the angles of view, including the beams at the center of the angle of view, propagate inside the horizontal propagation part 211 at angles in two-dimensional directions (the X-Z cross-sectional direction and the Y-Z cross-sectional direction), and propagating beams are configured to propagate spirally inside the horizontal propagation part 211.

Propagating beams propagate in the horizontal direction to the right surface 2116 while repeating internal reflection on four surfaces (the front surface 2111, the rear surface 2112, the top surface 2113, and the bottom surface 2114) of the horizontal propagation part 211, parallel to the horizontal direction. Propagating beams having reached the bottom surface 2114 of the horizontal propagation part 211 are partially reflected by the transmissive reflection film provided at the joint surface and partially pass through, and the propagating beams having passed through the joint surface enter the horizontal mirror set 212. The plurality of horizontal output mirrors 2120 having inclinations in the Y-Z cross section is disposed so as to be arranged in the Z-axis direction in the horizontal mirror set 212. Propagating beams having entered the horizontal mirror set 212 are reflected by the horizontal output mirrors 2120 to be deflected to the Y-axis direction, and enter the vertical light guide part 22.

As described above, in the present embodiment, propagation angles are the positive direction and the negative direction in each of the X-Z cross-sectional direction and the Y-Z cross-sectional direction for one angle of view, and four directions in total. With this arrangement, the horizontal propagation part 211 can be filled with propagating beams, so a light quantity distribution of beams that enter a viewer's eye can be made uniform even when propagating beams are output from any position of the horizontal propagation part 211.

Although not shown in the drawing, for propagation angles inside the horizontal light guide part 21, a beam at each angle of view has an angle of 0 degrees to ±7.7 degrees in the X-Z cross-sectional direction and 0 degrees to ±13.5 degrees in the Y-Z cross-sectional direction with respect to a beam at the center of the angle of view. When a beam exits from a light guide plate having a refractive index N=1.4 or higher and 2.0 or lower into an air layer having a refractive index N=1.0 and enters a viewer's eye, the light refracts at the exit surface, so the angle of view is greater than the propagation angle. The display apparatus has a vertical angle of view of 0 degrees to ±11.6 degrees converted from the X-Z propagation angle since the X-Z cross-sectional direction is the vertical direction and has a horizontal angle of view of 0 degrees to ±20.0 degrees converted from the Y-Z propagation angle since the Y-Z cross-sectional direction is the horizontal direction.

A propagation angle ω in the horizontal propagation part 211 and an incident angle Ψ the side surfaces (the top surface, the bottom surface, the front surface, and the rear surface) of the horizontal propagation part 211 have the relationship expressed by ω=90 degrees−Ψ. When a propagation angle of a propagating beam inside the horizontal propagation part 211 is set to a greater value, light is not totally reflected on the side surfaces of the horizontal propagation part 211 and passes through the side surfaces depending on the refractive index of the material of the horizontal propagation part 211. For example when the material of the horizontal propagation part 211 is synthetic quartz (Nd=1.45857), a critical angle is 43.28 degrees, and light passes through the side surfaces of the horizontal propagation part 211 at a propagation angle of ω=90 degrees−43.28 degrees=46.72 degrees or greater.

In the present embodiment, a beam is propagated in the two-dimensional directions inside the horizontal propagation part 211, so a resultant incident angle in the two-dimensional directions to the side surfaces of the horizontal propagation part 211 can be increased as compared to when a beam is propagated in one-dimensional direction. A propagation angle ω inside the horizontal propagation part 211 may be the range of a conditional expression (1).

10 degrees≤ω≤50 degrees　　　Conditional Expression (1).

When the propagation angle ω exceeds the upper limit, incident angles to the side surfaces of the horizontal propagation part 211 are less than the critical angle depending on a material. When the propagation angle ω becomes less than the lower limit, many gaps appear in the deflected beams reflected by the horizontal mirror set 212. The latter case will be described in detail later with reference to FIGS. 4A to 4D.

In the present embodiment, within the horizontal propagation part 211, propagation angles (X-Z propagation angles ωxz) in the X-Z cross-sectional direction are +18.3 degrees to +33.7 degrees, and −18.3 degrees to −33.7 degrees, and propagation angles (Y-Z propagation angles ωyz) in the Y-Z cross-sectional direction are +18.5 degrees to +44.5 degrees, and −18.5 degrees to −44.5 degrees. An X-Z propagation angle in one-dimensional direction or a Y-Z propagation angle in one-dimensional direction can be set to "90 degrees−(Critical angle)" or greater within the range in which a propagation angle ω in two-dimensional directions is less than "90 degrees−(Critical angle)", and beams having a wide angle of view can be propagated while a loss in light quantity is reduced.

FIG. 3C shows how beams at angles of view propagate.

A beam at each angle of view will be described with reference to FIG. 3C.

In FIG. 3C, a beam 511 at an angle of view propagates inside the horizontal propagation part 211 at a Y-Z propagation angle of +32 degrees, a beam 523 at an angle of view propagates inside the horizontal propagation part 211 at a Y-Z propagation angle of −45 degrees, and a beam 533 at an angle of view propagates inside the horizontal propagation part 211 at a Y-Z propagation angle of −19 degrees. A propagating beam at each angle of view has propagation angles in a positive direction and a negative direction, and FIG. 3C shows one of them.

The propagating beams 511, 523, 533 propagate while repeating internal reflection (total reflection) on the top surface, front surface, and rear surface of the horizontal propagation part 211 and internal reflection (partial reflection) on the bottom surface of the horizontal propagation part 211. When a propagating beam reaches the bottom surface 2114 to which the transmissive reflection film is applied, part of the propagating beam transmits through the bottom surface 2114 and enters the horizontal mirror set 212, and another part reflects on the bottom surface 2114 and propagates inside the horizontal propagation part 211.

The output mirrors 2120 having inclinations in the Y-Z cross-sectional direction are disposed in the horizontal mirror set 212. Light having entered the horizontal mirror set 212 is reflected by the output mirrors 2120, and the propagation angle in the Y-Z cross-sectional direction is deflected. Then, the light transmits through the bottom surface of the horizontal mirror set 212 and enters the vertical light guide part 22.

At this time, since the horizontal mirror set 212 is placed on the vertical light guide part 22 side of the horizontal propagation part 211, the number of times of reflection at the time of propagation inside the horizontal propagation part 211 is reduced, so a loss in light quantity is reduced.

This will be described in detail. When the viewer sees straight ahead, beams that exit from the center of the vertical light guide part 22 of the light guide plate 2 in the horizontal direction (Z-axis direction) reach the viewer's eye to show an image. When the viewer sees to the left, beams exiting from the left side of the vertical light guide part 22 reach the viewer's eye to show an image. When the viewer sees to the right, beams exiting from the right side of the vertical light guide part 22 reach the viewer's eye to show an image. In FIG. 3C, the beam 511 has a Y-Z propagation angle of +32 degrees, and the beam reflected by the horizontal mirror set 212 travels straight downward in the Y-Z cross section and corresponds to a beam that travels at the center of the angle of view for the eye. The beam 523 has a Y-Z propagation angle of −45 degrees, and the beam reflected by the horizontal mirror set 212 travels to the lower right in the Y-Z cross section and corresponds to a beam that travels at the left side of the angle of view for the eye. The beam 533 has a Y-Z propagation angle of −19 degrees, and the beam reflected by the horizontal mirror set 212 travels to the lower left in the Y-Z cross section and corresponds to a beam that travels at the right side of the angle of view for the eye. Therefore, when the beam 511 exits from around the center of the horizontal mirror set 212, the beam 511 becomes an effective beam that enters the viewer's eye. When the beam 523 exits from the left side of the horizontal mirror set 212 (the horizontal propagation part left surface 2115 side), the angle of view beam 523 becomes an effective beam that enters the viewer's eye. When the beam 533 exits from the right side of the horizontal mirror set 212 (the horizontal propagation part right surface 2116 side), the beam 533 becomes an effective beam that enters the viewer's eye. In this way, a beam having a greater absolute value of the propagation angle becomes an effective beam when the beam exits from the horizontal propagation part incident surface (left surface 2115) side of the horizontal mirror set 212. When the absolute value of the propagation angle is large, the number of times of reflection inside the horizontal propagation part 211 for a propagation distance increases, and the number of times of reflection at the time of propagating to a position where the beam becomes an effective beam increases, with the result that a loss in light quantity arises. Particularly, the transmissive reflection film is installed at the joint surface between the bottom surface 2114 of the horizontal propagation part 211 and the horizontal mirror set 212 and the reflectance at the joint surface (or a joint region at the bottom surface 2114 of the horizontal propagation part 211) is about 50%, the light quantity of a propagating beam decreases with the number of times of reflection. This results in that the light quantity of a propagating beam decreases as the position of the propagating beam becomes farther from the incident surface 2115 of the horizontal propagation part 211; however, to make the light quantity distribution uniform in all the angles of view, light quantities are adjusted to a lower light quantity, so a loss in light quantity is problematic.

As in the case of the present embodiment, when the horizontal mirror set 212 is disposed between the horizontal propagation part 211 and the vertical propagation part 221, beams having a greater absolute value of the propagation angle become effective beams when the beams exit from the horizontal propagation part incident surface 2115 side of the horizontal mirror set 212. Thus, the number of times of reflection inside the horizontal propagation part 211 is reduced, so a reduction of loss in light quantity is possible.

Figure 4A:
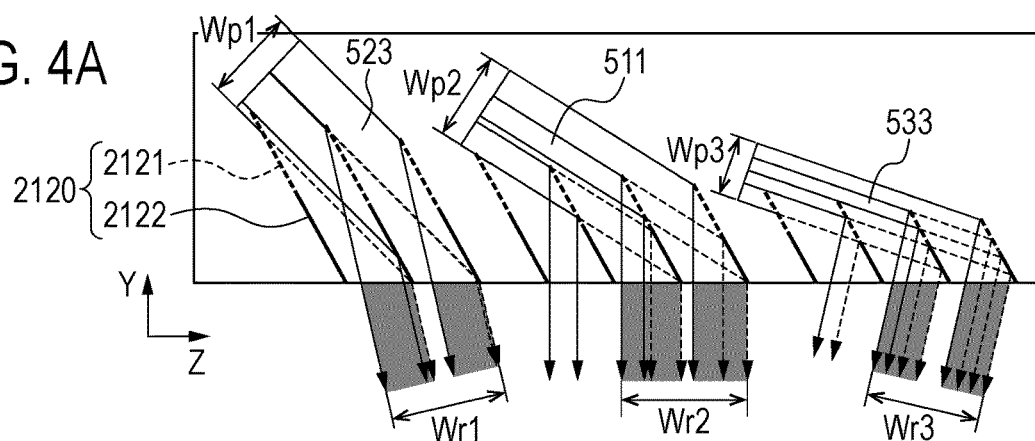
FIG. 4A is a diagram that illustrates a horizontal mirror set of the first embodiment to which the present invention is applicable.
Figure 4B:
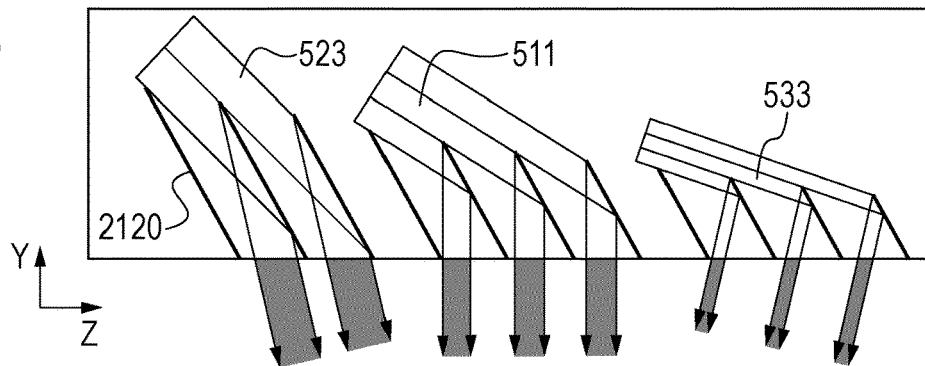
FIG. 4B is a diagram that illustrates the horizontal mirror set of a comparative example.
Figure 4C:
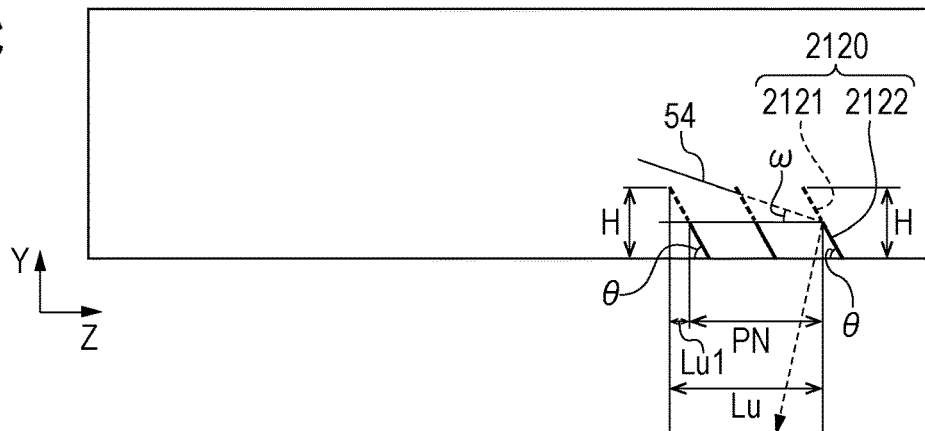
FIG. 4C is a diagram that illustrates the horizontal mirror set of the first embodiment to which the present invention is applicable.
Figure 4D:
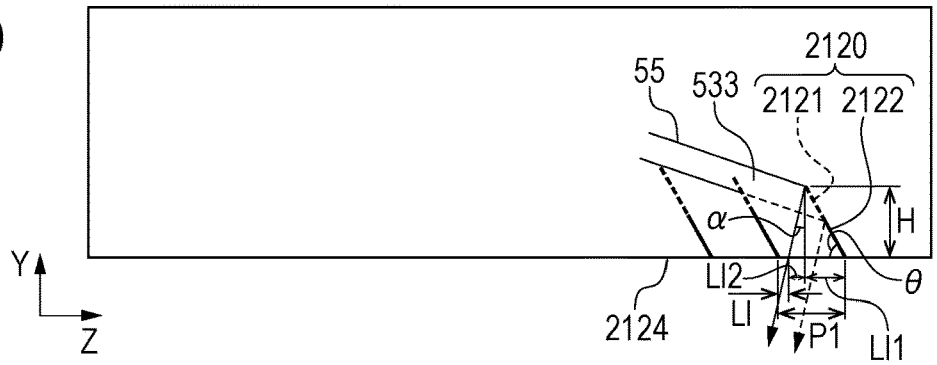
FIG. 4D is a diagram that illustrates the horizontal mirror set of the first embodiment to which the present invention is applicable.

FIG. 4A, FIG. 4C, and FIG. 4D are diagrams that illustrate the horizontal mirror set 212 in the present embodiment. FIG. 4B is a diagram of the horizontal mirror set 212 of a comparative example.

The configuration of the output mirrors 2120 of the horizontal mirror set 212 in the present embodiment will be described with reference to FIG. 4A to FIG. 4D.

The 43 horizontal output mirrors 2120 arranged parallel to one another in the Z-axis direction are used as the horizontal mirror set 212. FIG. 4A schematically shows part of the horizontal output mirrors 2120. A normal line to each of the 43 horizontal output mirrors 2120 is inclined at 61 degrees in the Y-Z direction within a plane including the Y direction and the Z direction. Each horizontal output mirror 2120 has two types of reflection regions 2121, 2122 having different reflectances and different transmittances. A half mirror having a reflectance of about 45% and a transmittance of about 45%, that is, the ratio between the reflectance and the transmittance is about 1:1, is disposed in the first reflection region 2121 of the horizontal output mirror 2120, located close to the horizontal propagation part 211. On the other hand, a high-reflectance mirror having a reflectance of about 85% and a transmittance of lower than or equal to 1% is disposed in the second reflection region 2122 of the horizontal output mirror 2120, located far from the horizontal propagation part 211. In other words, the upper half of the horizontal output mirror 2120 in height (Y direction) is the half mirror 2121, and the lower half is the high-reflectance mirror 2122. Thus, of beams coming from the horizontal propagation part 211, part of incident beams to the half mirror 2121 are reflected to be deflected toward the vertical light guide part 22, and another part of the incident beams transmit through the half mirror 2121 and are then reflected by the high-reflectance mirror 2122 of the subsequent output mirror 2120 to be deflected toward the vertical light guide part 22. In other words, when the horizontal output mirrors 2120 include first and second mirrors, light having transmitted through the first reflection region of the first mirror is reflected by the second reflection region of the second mirror and enters the vertical light guide part, and light reflected by the second reflection region of the first mirror directly enters the vertical light guide part not by way of the second mirror. At this time, deflected beams deflected by the output mirrors 2120 toward the vertical light guide part 22 have wider beam widths than the beam widths of the propagating beams within the horizontal propagation part 211. The beam widths of the propagating beams inside the horizontal propagation part 211 are Wp1, Wp2, and Wp3, and the widths of the deflected beams after being reflected by the horizontal output mirrors 2120 are Wr1, Wr2, and Wr3. The widths of the beams after being reflected by the horizontal output mirrors 2120 are constantly larger like Wr1>Wr2>Wp2, and Wr3>Wp3, and the beams reach the viewer's eye with these beam widths, so the effect of expanding the pupil in the horizontal direction is provided by the horizontal light guide part 21.

FIG. 4B shows the comparative example. A horizontal mirror set of the comparative example differs from the configuration of the present embodiment in that the entire region of each horizontal output mirror 2120 is a high-reflectance mirror. Although deflected beams deflected by the horizontal output mirrors 2120 are also expanded to be wider than the beam widths of propagating beams as in the case of the present embodiment, there are many gaps (no beam portions) in the deflected beams, so there is a problem in uniformity in light quantity within the deflected beams.

When the half mirror 2121 is disposed in part of each horizontal output mirror 2120 as in the case of the present embodiment, propagating beams are separated by the half mirror 2121 into reflected beams and transmitted beams, so gaps that appear when the beam widths of the reflected beams are expanded are filled by the transmitted beams. For this reason, the high-reflectance mirror 2122 is disposed on the vertical light guide part side of each half mirror 2121, and beams having transmitted through the half mirrors 2121 reflect on the high-reflectance mirrors 2122 of the adjacent horizontal output mirrors 2120 and till the above-described gaps.

In this way, by splitting a beam entering each horizontal output mirror 2120 into two beams and deflecting the beams toward the vertical light guide part 22, not only the existing advantageous effect of expanding the width of each of deflected beams but also the advantageous effect of making the light quantity distribution in the expanded deflected beams uniform is obtained.

Propagating beams totally reflected by the top surface 2113 of the horizontal propagation part 211 reach the horizontal output mirrors 2120. The first reflection region of each horizontal output mirror 2120 is disposed on the horizontal propagation part top surface 2113 side of the second reflection region, that is, the first reflection region is disposed closer to the top surface 2113 of the horizontal propagation part 211 than the second reflection region. By adopting this configuration, expansion of the pupil by deflected beams and uniformity in light quantity are achieved.

The horizontal output mirror 2120 of the present embodiment is configured such that the half mirror 2121 and the high-reflectance mirror 2122 are disposed one above the other on halves at the ratio of 1:1; however, the ratio is not limited thereto. The ratio at which the half mirror 2121 and the high-reflectance mirror 2122 are disposed may be 2:1, 3:1, 4:1, or the like. Furthermore, the half mirror 2121 may be entirely disposed. As compared to these arrangements, when the half mirror 2121 and the high-reflectance mirror 2122 are disposed at 1:1, a beam that originates from light having transmitted through the half mirror 2121 and reflected from the high-reflectance mirror 2122 is disposed between beams reflected by the half mirrors 2121. This configuration is suitable for expanding the widths of beams, making the light quantity distribution in the expanded beams uniform, and improving light usage efficiency. The half mirror 2121 is not limited to the configuration that the reflectance is 45% and the transmittance is 45% and may be an amplitude splitting mirror that splits amplitude. For example, when the transmittance is set so as to be higher than the reflectance by setting the reflectance to 41% and setting the transmittance to 49%, the light quantity of a reflected beam from the half mirror is substantially equal to the light quantity of a beam having transmitted through the half mirror and reflected from the high-reflectance mirror, and the light quantity distribution in beams can be corrected further uniformly. Even when the ratio between the reflectance and the transmittance is 2:1 or 1:2, the half mirror is usable with practically no problem.

Of the horizontal output mirrors 2120, no mirror follows the last mirror (the mirror farthest from the incident surface 2115) and has no effective part, so the light quantity of a deflected beam is increased by setting both the first region 2121 and the second region 2122 as high-reflectance mirrors.

The interval between any adjacent horizontal output mirrors 2120 is preferably less than a pupil diameter 4 mm of the eye 5 and more preferably less than or equal to 2 mm, that is, sufficiently less than the pupil diameter. However, when the interval between any adjacent horizontal output mirrors 2120 is less than 0.5 mm, a numerical aperture reduces, and resolving power becomes problematic, so the interval P between any adjacent horizontal output mirrors 2120 preferably takes the following range.

$$0.5 \text{ mm} \leq P \leq 2.0 \text{ mm} \qquad \text{Conditional Expression (2).}$$

As shown in FIG. 1, when the viewer sees a display image, beams that are in charge of the left-side angle of view of the image exit from the left side of the light guide plate 2, beams that are in charge of the right-side angle of view of the image exit from the right side of the light guide plate 2, and both enter the viewer's eye.

As in the case of the present embodiment, when the horizontal mirror set 212 is disposed between the horizontal propagation part 211 and the vertical light guide part 22, beams having larger propagation angles are used at locations near the incident surface 2115 (the left side of the light guide plate 2 in FIG. 2), and beams having smaller propagation angles are used at locations far from the incident surface 2115 (the right side of the light guide plate 2 in FIG. 2).

In propagation inside the horizontal propagation part 211, total reflection occurs on the front surface 2111, the rear surface 2112, and the top surface 2113; however, the reflectance is lower than 100% at the bottom surface 2114 because reflection by the transmissive reflection film occurs on the bottom surface 2114, and the light quantity of propagating light decreases according to the number of times of reflection.

When the horizontal mirror set 212 is disposed between the horizontal propagation part 211 and the vertical light guide part 22 as in the case of the present embodiment, light usage efficiency is improved by making the number of times of reflection at each angle of view uniform and reducing the number of times of reflection on the bottom surface 2114 of the horizontal propagation part 211. In this way, it is advantageous in that propagation angles and locations to be used can be set to a suitable relationship. In addition, different from the bottom surface 2114 of the horizontal propagation part 211, no reflection occurs at a bottom surface 2124 of the horizontal mirror set 212. Therefore, the region of the bottom surface 2124 of the horizontal mirror set 212, from which beams exit, is joined with the region of the vertical propagation part 221, which beams enter, so the horizontal light guide part 21 and the vertical light guide part 22 are easily unified. Thus, the positional relationship between the horizontal light guide part 21 and the vertical light guide part 22 is maintained with high accuracy, so a good image can be constantly displayed.

In this way, the configuration of the present embodiment is advantageous in improvement of light usage efficiency resulting from a reduction in the number of times of reflection by the transmissive reflection film and unification of the light guide plate 2 as compared to the case where the horizontal mirror set 212 is disposed on the top surface 2113 side of the horizontal propagation part 211 as described in Japanese Patent Application Laid-Open No. 2010-533316 or International Publication No. WO2015/076335. In addition, the configuration of the present embodiment is similarly advantageous as compared to the case where the horizontal mirror set 212 is disposed in the horizontal propagation part 211 and beams finally reflected from the bottom surface of the horizontal propagation part 211 are reflected by the horizontal mirror set 212 as in the case of Japanese Patent Application Laid-Open No. 2005-521099.

In the horizontal mirror set 212 of the present embodiment, the interval between any adjacent two horizontal output mirrors 2120 is constantly set to 1 mm equally, and the height (Y direction) is changed according to the position of the horizontal output mirror 2120, The horizontal output mirror 2120 near the incident surface 2115 of the horizontal propagation part 211 is higher and becomes lower in height as the position of the horizontal output mirror 2120 gets away from the incident surface 2115 (according to the distance in the Z direction). Since propagating beams totally reflected from the top surface 2113 of the horizontal propagation part 211 enter the horizontal output mirrors 2120, a distance from the top surface 2113 of the horizontal propagation part 211 is increased as the position of the horizontal output mirror 2120 gets away from the incident surface 2115 of the horizontal propagation part 211. This is because, as described above, the absolute value of the propagation angle of a propagating beam to be an effective beam reduces with a distance from the incident surface 2115 of the horizontal propagation part 211, so the height of the horizontal output mirror 2120 is lowered according to the absolute value of the associated propagation angle. The incident surface 2115 side of the horizontal propagation part 211 is a region where propagating beams having propagation angles of ±45 degrees become effective beams, and the horizontal output mirrors 2120 are set to be higher, that is, 3.0 mm, such that any gap between the adjacent beams reduces at the time when the propagating beams are deflected by the horizontal output mirrors 2120. The center of the horizontal mirror set 212 is a region where propagating beams having median propagation angles ±32 degrees become effective beams, and the horizontal output mirrors 2120 are set to a medium height, that is, 1.8 mm. The opposite side of the horizontal mirror set 212 from the incident surface is a region where propagating beams having smaller propagation angles ±19 degrees become effective beams, and the horizontal output mirrors 2120 are set to be lower, that is, 1.2 mm. In this way, the height of the horizontal output mirror 2120 is changed according to the propagation angle of a propagating beam that becomes an effective beam.

In FIG. 4A and FIG. 4B, the heights of the horizontal output mirrors 2120 are all varied, and the heights are reduced linearly. Alternatively, the heights may be reduced in a stepwise manner by reducing the heights every several mirrors, or the heights may be reduced nonlinearly (for example, along a sine curve). Alternatively, those may be combined.

FIG. 4C and FIG. 4D are diagrams that illustrate a method of determining the heights of the horizontal output mirrors.

An upper limit of the height of each horizontal output mirror 2120 will be described with reference to FIG. 4C.

In each of the horizontal output mirrors 2120 of the present embodiment, the first region 2121 is a half mirror, the second region 2122 is a high-reflectance mirror, and a beam 54 heading toward the boundary between the first region 2121 and the second region 2122 enters from the horizontal propagation part 211 to the horizontal mirror set 212.

To set the number of half mirrors through which the beam 54 transmits to less than or equal to N, the height of the Nth last horizontal output mirror 2120 from the horizontal output mirror 2120 of interest (toward the incident surface side) is defined such that the beam 54 touches a top end of the Nth last horizontal output mirror 2120, and the upper limit of the height of the horizontal output mirror 2120 of interest is set based on the defined height of the Nth last horizontal output mirror 2120. The number of half mirrors through which a beam parallel to the beam 54 and reflects on the second region 2122 transmits is preferably less than or equal to three. An interval in the Z-axis direction from the boundary between the first region 2121 and the second region 2122 of the horizontal output mirror 2120 of interest to the top end of the Nth last horizontal output mirror 2120 is denoted by Lu. The interval Lu is obtained from an interval PN between the horizontal output mirror 2120 of interest and the Nth last horizontal output mirror 2120 and a width Lu1 that is half the width of the Nth last horizontal output mirror 2120 at the time when the horizontal output mirror 2120 is disposed at an inclination angle of θ degrees. It is assumed that the beam 54 having a propagation angle ω enters the boundary between the first region 2121 and second region 2122 of the horizontal output mirror 2120 of interest. At this time, at the position of the top end of the Nth last horizontal output mirror 2120, the beam 54 passes at the height that is higher by Lu×tan ω from the height of the boundary between the first region 2121 and second region 2122 of the horizontal output mirror 2120 of interest. Here, when the height of the Nth last horizontal output mirror 2120 is set to a height such that the Nth last horizontal output mirror 2120 does not block the beam 54, the number of mirrors through which a beam parallel to the beam 54 and reflects on the second region 2122 transmits can be set to less than or equal to N. In other words, the height of the Nth last horizontal output mirror 2120 may be set such that H/2<Lu×tan ω. This also applies to the horizontal output mirror 2120 of interest.

A lower limit of the height of each horizontal output mirror 2120 will be described with reference to FIG. 4D.

A beam 55 enters a top end of the horizontal output mirror 2120, the beam 55 is reflected by the first region 2121 of the horizontal output mirror 2120, and the beam 55 passes between the horizontal output mirror 2120 of interest and the last horizontal output mirror 2120. At this time, when the height H of the horizontal output mirror 2120 is low for a pitch P1 of the horizontal output mirror 2120, an interval L1 between the last horizontal output mirror 2120 and the reflected light 55 increases, with the result that a gap occurs in deflected beams. The lower limit of the height of the horizontal output mirror 2120 is set such that a gap greater than or equal to a predetermined width B is not formed in deflected beams at the horizontal output mirror 2120. Preferably, any gap in the deflected beams is set such that the predetermined width B≤0.5 mm. In the drawing, L11 denotes the length of the horizontal output mirror 2120 in the Z direction, and L11=H/tan θ. L12 denotes a distance that the reflected light of the beam 55 travels in the Z direction from the reflected position to the bottom surface 2124 of the horizontal mirror set 212, and L12=H×tan α. Under such conditions, the height H of each horizontal output mirror 2120 may satisfy the relationship of the conditional expression (3).

$$(P_1 - B) \times \frac{\tan\theta}{1 - \tan\alpha \times \tan\theta} < \qquad \text{Conditional Expression (3)}$$

$$H < \frac{4 \times P_N \times \tan\omega \times \tan\theta}{\tan\theta - \tan\omega}.$$

where
θ is the angle of the output mirror,
ω is the propagation angle of an effective propagating beam in the output mirror of interest,
α is a difference between the propagation angle of an effective propagating beam and the propagation angle of a beam at the center of the angle of view in the output mirror of interest,
P1 is an interval between the output mirror of interest and the last output mirror,
PN is an interval between the output mirror of interest and the Nth last output mirror, and
B is an interval between a deflected beam and the output mirror (B≤0.5 mm).

In the conditional expression (3), N may be less than or equal to three. In the present embodiment, N is set to two. When the height exceeds the upper limit of the conditional expression, the number of times that a beam transmits through half mirrors increases, with the result that a loss in light quantity arises and becomes problematic.

In the present embodiment, the height of each horizontal output mirror 2120 is determined by using the conditional expression (3); however, the configuration is not limited thereto. The height of each vertical output mirror in the vertical mirror set 222 may be determined by using the conditional expression (3).

Figure 5A:
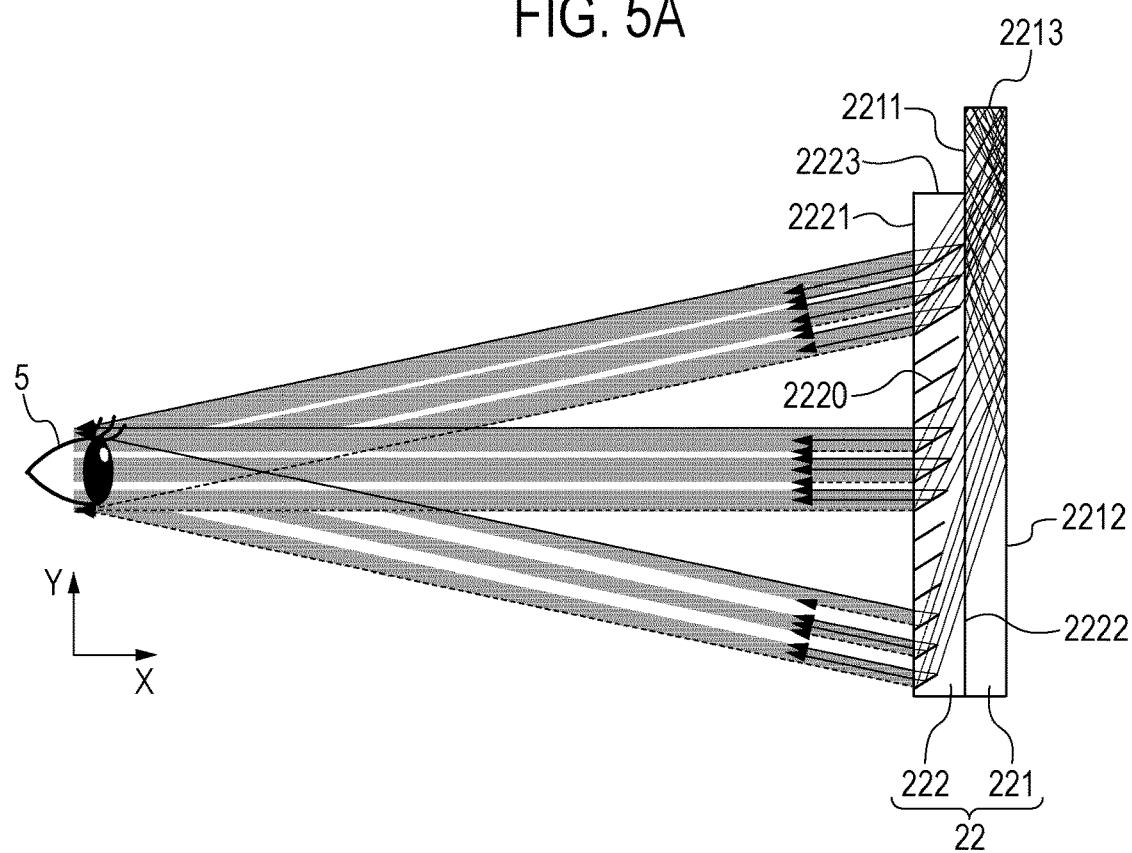
FIG. 5A is a diagram that illustrates a vertical light guide part of the first embodiment to which the present invention is applicable.

FIG. 5A shows an X-Y cross-sectional view of the vertical light guide part in the display apparatus of the present embodiment.

As shown in FIG. 5A, the vertical light guide part 22 is made up of the vertical propagation part 221 and the vertical mirror set 222. The vertical propagation part 221 is a flat plate, has a front surface 2211, a rear surface 2212, and a top surface 2213 as polished surfaces, and light blocking films (light blocking parts) that block unnecessary light are provided on the other three surfaces. The top surface 2213 of the vertical propagation part 221 is used as an incident surface, and beams from the horizontal light guide part 21 enter from the incident surface. Of the front surface 2211 (second exit surface) of the vertical propagation part 221, a region joined with the vertical mirror set 222 is used as an exit region, and light having passed through at least part of the vertical propagation part 221 exits from the exit region. Propagating beams having entered the vertical propagation part 221 are propagated in the vertical direction while repeating internal reflection on two or less surfaces (the front surface 2211 and the rear surface 2212) of the four surfaces parallel to the vertical direction of the vertical propagation part 221. The vertical mirror set 222 is disposed so as to face the rear surface 2212 (second reflection surface) of the vertical propagation part 221. In the vertical mirror set 222, the plurality of vertical output mirrors 2220 having a transmissive reflection surface that transmits part of incident beams and reflects part of the incident beams is provided, and the vertical output mirrors 2220 are arranged in the Y-axis direction so as to be inclined within the X-Y cross section and parallel to one another. The outer shape of the vertical mirror set 222 is a flat plate shape, and has a front surface 2221 and a rear surface 2222 as polished surfaces. The vertical propagation part 221 and the vertical mirror set 222 each are widest in the horizontal direction (Z-axis direction), second widest in the vertical direction (Y-axis direction), and narrowest in the depth direction (X-axis direction). The vertical mirror set 222 is disposed on the viewer's eye 5 side of the vertical propagation part 221, and the vertical propagation part 221 and the vertical mirror set 222 are unified by joining the front surface 2211 of the vertical propagation part 221 with the rear surface 2222 of the vertical mirror set 222. A transmissive reflection film is applied to a joint surface between the front surface 2211 of the vertical propagation part 221 and the rear surface 2222 of the vertical mirror set 222. The transmissive reflection film transmits part of incident beams and reflects part of the incident beams.

Figure 5B:
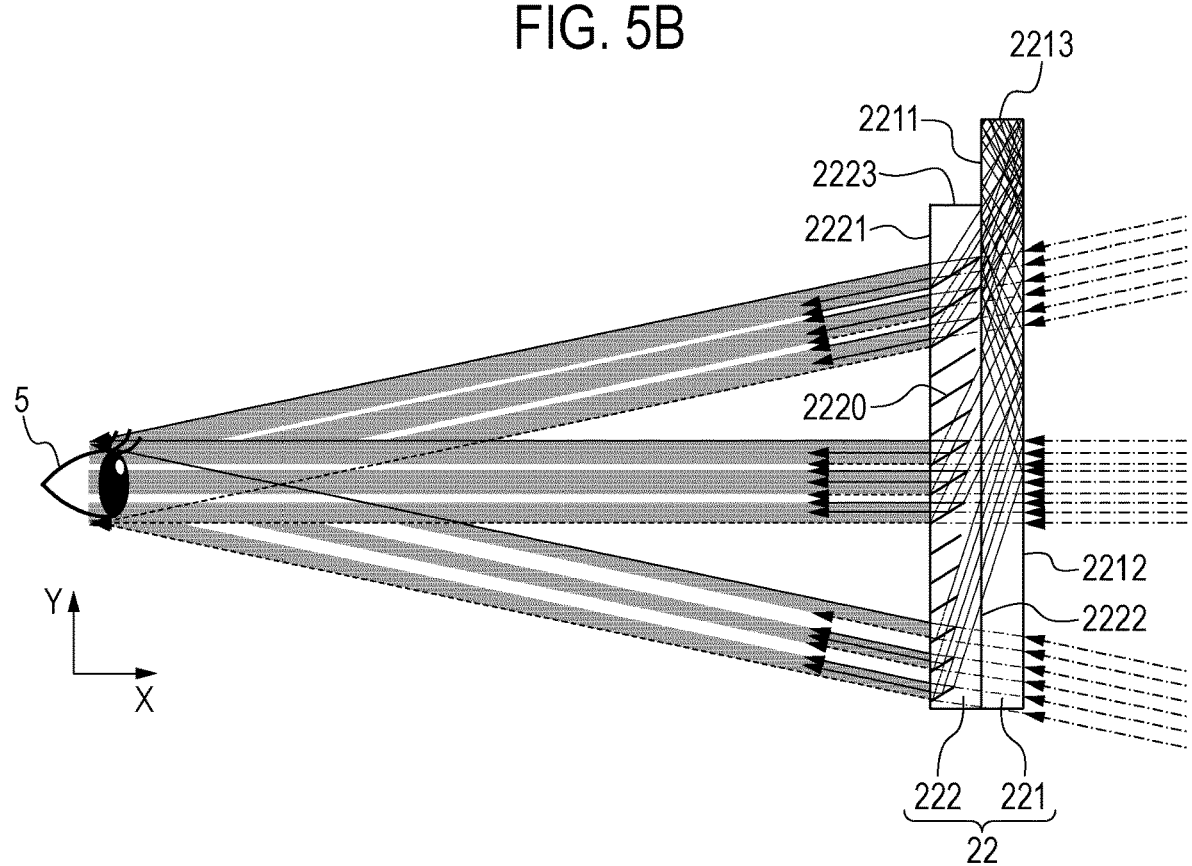
FIG. 5B is a diagram that illustrates the vertical light guide part of the first embodiment to which the present invention is applicable.

The horizontal light guide part 21 and the vertical light guide part 22 are unified by joining the bottom surface 2124 of the horizontal mirror set 212 of the horizontal light guide part 21 shown in FIG. 3B with the top surface 2213 of the vertical propagation part 221 of the vertical light guide part 22 shown in FIGS. 5A and 5B.

Propagating beams reflected by the horizontal output mirrors 2120 of the horizontal light guide part 21 enter the top surface 2213 of the vertical propagation part 221, and propagate inside the vertical propagation part 221 while repeating internal reflection between the front surface 2211 and rear surface 2212 of the vertical propagation part 221. At a portion joined with the rear surface 2222 of the vertical mirror set 222 in the front surface 2211 of the vertical propagation part 221, because of the transmissive reflection film provided at the joint surface, part of propagating beams transmit through the transmissive reflection film and enter the vertical mirror set 222, and part of the propagating beams reflect and propagate inside the vertical propagation part 221 again.

The vertical mirror set 222 includes the 28 vertical output mirrors 2220 disposed parallel to one another at an inclination angle of 58 degrees in the X-Y direction with respect to the rear surface 2212. Each vertical output mirror 2220 reflects part of propagating beams having entered the vertical mirror set 222 to deflect the beams toward the front surface 2221 of the vertical mirror set 222 and transmits part of the propagating beams. Propagating beams having transmitted through the first vertical output mirror 2220 are reflected by the subsequent vertical output mirror 2220 to be deflected toward the front surface 2221 of the vertical mirror set 222.

The front surface 2221 of the vertical mirror set 222 is parallel to the rear surface 2212 of the vertical propagation part 221. When propagating beams directly enter the front surface 2221 of the vertical mirror set 222 at angles at which the propagating beams have entered the vertical mirror set 222, the propagating beams are totally reflected because the incident angles exceed a critical angle. On the other hand, propagating beams deflected by the vertical output mirrors 2220 have smaller incident angles to the front surface 2221 of the vertical mirror set 222 than the critical angle, and exit from the front surface 2221 of the vertical mirror set 222 toward the viewer's eye 5 (toward a third direction). Thus, an image is displayed by causing beams to enter the viewer's eye 5. An incident angle is an angle formed between the incident direction of a beam and a normal line to an incident surface.

In the vertical light guide part 22 as well, as in the case of the horizontal light guide part 21, the width of each of deflected beams is expanded so as to be wider than the width of each propagating beam with such a configuration that a propagating beam at one angle of view is deflected by a plurality of the vertical output mirrors 2220.

FIG. 6 is a schematic diagram of the vertical output mirrors of the present embodiment.

The vertical output mirrors of the present embodiment will be described with reference to FIG. 6.

The 28 vertical output mirrors 2220 are used as the vertical mirror set 222 of the present embodiment. In the present embodiment, the number of the horizontal output mirrors is greater than the number of the vertical output mirrors. This is because, of the angles of view for the viewer's eye, a horizontal angle of view is set so as to be greater than a vertical angle of view and, in addition, the distance between the viewer's eye and the horizontal mirror set is longer than the distance between the viewer's eye and the vertical mirror set. With this configuration, a good image can be constantly provided to the viewer.

FIG. 6 shows the six vertical output mirrors 2220 out of the 28 vertical output mirrors 2220. The vertical output mirrors 2220 of the present embodiment each are a rectangular mirror having a long axis in the Z direction. A polarization beam splitter (PBS) that is a polarization splitting mirror that splits a beam into polarized beams is used as each vertical output mirror 2220 of the present embodiment. More specifically, a wire grid polarizer that is a type of form birefringent PBS using a sub-wavelength structure (SWS). The wire grid polarizer is such that many dielectric wires 2226 (metal wires made of, for example, aluminum) are arranged in a grid at a pitch of less than or equal to the wavelength (about 100 nm) on an optical substrate 2225 (for example, a glass substrate). The wire grid polarizer has such characteristics that the wire grid polarizer transmits light (p-polarized light) of which the electric field oscillates in a direction 2227 parallel to the wire grid (metal wires) and reflects light (s-polarized light) of which the electric field oscillates in a direction perpendicular to the wire grid. In other words, the wire grid polarizer has such characteristics that the wire grid polarizer is a polarization beam splitter that allows selection of the polarization direction of reflection or transmission with the orientation of the wire grid.

In the present embodiment, the vertical output mirrors 2220 are disposed such that the orientations of the wire grids of the vertical output mirrors 2220 are alternately rotated by 90 degrees, so the orientations of the wire grids of the adjacent vertical output mirrors 2220 are disposed perpendicularly to each other. Specifically, a first polarization beam splitter that is one of the vertical output mirrors 2220 has the orientation of the wire grid at 90 degrees with respect to the long axis of the vertical output mirror 2220 and a second polarization beam splitter that is the adjacent vertical output mirror 2220 has the orientation of the wire grid at 0 degrees. The vertical output mirror 2220 that a propagating beam has first entered splits the propagating beam into a reflected beam and a transmitted beam, deflects the reflected beam toward the front surface 2221 of the vertical mirror set 222, and the adjacent vertical output mirror 2220 reflects the transmitted beam to deflect the beam toward the front surface 2221 of the vertical mirror set 222. Since the orientation of the wire grid of the first vertical output mirror 2220 and the orientation of the wire grid of the adjacent vertical output mirror 2220 are perpendicular to each other, the transmitted beam of the first vertical output mirror 2220 is totally reflected by the adjacent vertical output mirror 2220. Light having transmitted through the first polarization beam splitter is reflected by the second polarization beam splitter and exits from the light guide plate 2, while light reflected by the first polarization beam splitter exits from the light guide plate 2 not by way of the second polarization beam splitter. Therefore, a propagating beam splits at 1:1 into a reflected beam and a transmitted beam at the first entered vertical output mirror 2220, and the transmitted beam reflects at the subsequently entered vertical output mirror 2220, so a single beam exits from the two vertical output mirrors 2220 toward the viewer's eye. Thus, deflected beams are formed, and the width of each of the deflected beams is expanded so as to be greater than the width of each propagating beam. When a dielectric multi-layer PBS is used as each vertical output mirror 2220 instead of a form birefringent PBS, the vertical output mirrors 2220 can only be configured such that p-polarized light having transmitted through the first entered vertical output mirror 2220 also transmits through the subsequently entered vertical output mirror 2220.

However, a form birefringent PBS is able to change the polarized direction of transmitting polarized light or reflecting polarized light by changing the orientation of the wire grid. Therefore, when the form birefringent PBS is used as each vertical output mirror 2220 as in the case of the present embodiment, p-polarized light having transmitted through the first entered vertical output mirror 2220 can be reflected by the adjacent vertical output mirror 2220. In the present embodiment, an organic electroluminescence (OLED) panel that emits light having a low degree of polarization LED) is used as the display element 4. However, when a liquid crystal panel, or the like, that emits light having a high degree of polarization is used as the display element 4, a depolarizing plate may be provided in an optical path between the display element 4 and the vertical mirror set 222. Specifically, a depolarizing plate may be disposed between the display element 4 and the incident optical system 3 or between the incident optical system 3 and the light guide plate 2.

Figure 7:
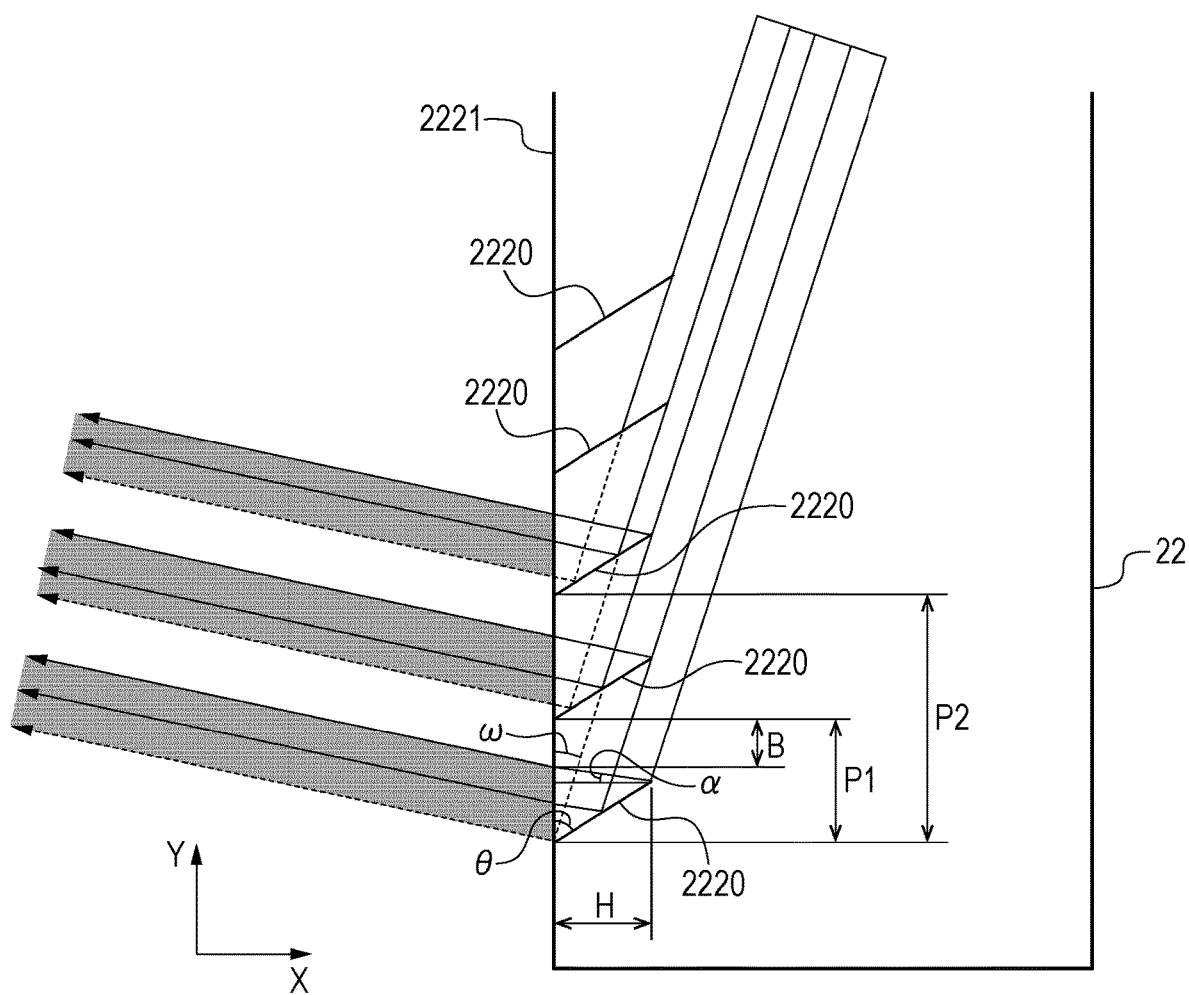
FIG. 7 is a diagram that illustrates the horizontal mirror set of the first embodiment to which the present invention is applicable.

FIG. 7 is a diagram that illustrates vertical output mirrors of the present embodiment.

FIG. 7 shows the five vertical output mirrors 2220.

A propagating beam having a small propagation angle ω is guided in the vertical light guide part 22, half of the light quantity reflects on the first reached vertical output mirror 2220, and the other half transmits therethrough. The reflected propagating beam is deflected toward the front surface 2221 of the vertical mirror set 222 and exits toward the viewer's eye. The transmitted propagating beam reflects on the subsequent vertical output mirror 2220 to be deflected toward the front surface 2221 of the vertical mirror set 222 and exits toward the viewer's eye.

At this time, the beam having first transmitted through the first vertical output mirror 2220 and reflected by the subsequent second vertical output mirror 2220 and the beam having first entered the second vertical output mirror 2220 and reflected by the second vertical output mirror 2220 are arranged side by side. Thus, gaps between beams in deflected beams that exit toward the viewer's eye are reduced, and a configuration that the viewer is able to view at each angle of view with a uniform distribution in light quantity is achieved.

At this time, by disposing the vertical output mirrors 2220 such that the heights H and intervals P of the vertical output mirrors 2220 satisfy the conditional expression (4), an appropriate configuration with reduced gaps between beams in deflected beams is achieved.

$$(P_1 - B) \times \frac{\tan \theta}{1 - \tan \alpha \times \tan \theta} < H < P_2 \times \tan \omega.$$ Conditional Expression (4)

where

θ is the angle of the output mirror,

ω is the propagation angle of an effective propagating beam in the output mirror of interest, α is a difference between the propagation angle of an effective propagating beam and the propagation angle of a beam at the center of the angle of view in the output mirror of interest, P1 is an interval between the output mirror of interest and the last output mirror, P2 is an interval between the output mirror of interest and the second last output mirror, B is an interval between a deflected beam and the output mirror (B≤0.5 mm).

When the height exceeds an upper limit, a propagating beam passes through three or more polarizers, and there occurs gaps in propagating beams that reach the output mirrors, and, as a result, gaps in deflected beams increase and become problematic. When the height becomes lower than a lower limit, the interval between a deflected beam and an output mirror increases, and, as a result, gaps in deflected beams increase and become problematic.

The height becomes greater than an average diameter (about 4 mm) of the pupil (pupil) of the viewer's eye, a light quantity distribution due to gaps in reflected beams is conspicuous and becomes problematic. When the height is lower than the lower limit, the width of each reflected beam becomes too narrow, and the resolving power decreases, so it is problematic.

A form birefringent polarizer, as compared to a dielectric multilayer polarization beam splitter, has such characteristics that incident angle characteristics and wavelength characteristics are maintained at high performance (reflectance, transmittance) in a wide range. In the vertical output mirrors 2220, the range of the incident angle is wide and is greater than or equal to 45 degrees and less than or equal to 70 degrees, and the wavelength is also used in a wide band of greater than or equal to 400 nm and less than or equal to 700 nm in visible light, so the vertical output mirror 2220 takes advantage of a wide angle, wide band, and high performance of a form birefringent polarizer.

In this way, the width of each beam that exits from the light guide plate 2 is expanded, and the light quantity distribution in each expanded beam is made uniform. Thus, 15 mm of eye motion box (EMB) is ensured at the position of the viewer's eye, and beams from a wide angle of view display image constantly enter the pupil of the viewer's eye even when the position of the pupil moves at the time of viewing a peripheral part of the display image, so a high-grade image can be provided.

In FIG. 5B, in addition to the vertical light guide part 22 and propagating beams in the vertical light guide part 22, shown in FIG. 5A, beams that enter the vertical light guide part 22 from the outside world are represented by the alternate long and short dashed lines.

Beams from the outside world transmit through the rear surface 2212 of the vertical propagation part 221, the front surface 2211, and the rear surface 2222 of the vertical mirror set 222 in this order, further transmits through the vertical output mirrors 2220 and the front surface 2221 of the vertical mirror set 222, and reaches the viewer's eye 5. Since a wire grid polarizer is used as each vertical output mirror 2220 of the present embodiment, a polarized beam in a direction perpendicular to the array direction of the wire grid is able to transmit through the wire grid polarizer. Thus, the viewer is able to view the outside world through the vertical light guide part 22, and an optical see-through function is exercised.

In addition, in the region from the vertical output mirrors 2220 to the viewer's eye 5, an optical path of propagating beams from the display element 4 and an optical path of beams from the outside are overlapped in the same optical path, so an image from the display element 4 can be displayed in the outside world.

In this way, the display apparatus 1 of the present embodiment allows the viewer to view a wide-angle of view, high-grade display image both in the horizontal direction and the vertical direction, allows the viewer to view the outside world by optical see-through, and allows the viewer to view both in a superposed manner.

The incident optical system 3 in the display apparatus 1 of the present embodiment causes light coming from the display element 4 to obliquely enter in two directions, that is, in the X-Y cross section and the Y-Z cross section, such that propagating beams are reflected by the top surface 2113 of the horizontal propagation part 211 and the rear surface 2212 of the vertical propagation part 221. Thus, the width of each beam to be irradiated to the viewer's eye is expanded in the two-dimensional directions, that is, the horizontal direction and the vertical direction, and a wide angle of view is obtained in the two-dimensional directions.

In the display apparatus 1 of the present embodiment, a combination of a half mirror and a mirror is used as each horizontal output mirror 2120 of the horizontal light guide part 21; however, the configuration is not limited thereto. Only half mirrors or a combination of a plurality of polarizers of which the orientations of wire grids intersect with each other may be used as the horizontal output mirrors 2120. The configuration of the above-described vertical mirror set (the configuration that rotated wire grid polarizers are disposed alternately) may be applied as the configuration of the horizontal mirror set 212.

The wire grid polarizers are used as the vertical output mirrors 2220 of the vertical light guide part 22; however, the configuration is not limited thereto. Half mirrors or combinations of a half mirror and a mirror may be used.

In the display apparatus 1 of the present embodiment, the configuration that the wire grid polarizers alternately rotated by 90 degrees are disposed as the vertical output mirrors 2220 of the vertical light guide part 22 is used. However, any adjacent wire grids are not limited to 90 degrees-rotation arrangement and may be a rotation arrangement of 30 degrees, 45 degrees, 60 degrees, 120 degrees, 135 degrees, or 150 degrees. In short, rotation is preferably greater than or equal to 30 degrees and less than or equal to 150 degrees; however, any adjacent wire grids just need to be oriented in different directions.

In the light guide plate 2 of the present embodiment, beams are guided in the horizontal direction (Z direction) inside the horizontal light guide part 21, and beams are guided in the vertical direction (Y direction) inside the vertical light guide part 22. However, as described in International Publication No. WO2015/076335, beams may be guided vertically (in the Y direction) inside the horizontal light guide part 21, and beams may be guided horizontally (in the Z direction) inside the vertical light guide part 22. The light guide plate 2 is configured as in the case of the present embodiment is more desirable because the long axis direction of the vertical mirror set 222 coincides with the horizontal direction and the visibility of the vertical mirror set 222 for the viewer can be reduced. In the display apparatus 1 of the present embodiment, the propagation direction (first direction) of beams in the horizontal propagation part 211 is perpendicular to the propagation direction (second direction) of beams in the vertical propagation part 221, and those directions are perpendicular to the direction (third direction) in which beams exit from the light guide plate 2. However, those are not necessarily perpendicular to one another and just need to intersect with one another.

In the light guide plate 2 of the present embodiment, the horizontal mirror set 212 is disposed between the horizontal propagation part 211 and the vertical propagation part 221. However, the horizontal mirror set 212 just needs to be disposed between the top surface 2113 of the horizontal propagation part 211 and the vertical propagation part 221, and, as in the case of Japanese Patent Application Laid-Open No. 2005-521099, a mirror set may be disposed in the horizontal propagation part 211. In this case, as in the case of Japanese Patent Application Laid-Open No. 2005-521099, it is not desirable that beams finally reflected by the bottom surface 2114 of the horizontal propagation part 211 be reflected by the mirror set. As in the case of the present embodiment, it is desirable that beams finally reflected by the top surface 2113 of the horizontal propagation part 211 be reflected by the mirror set. In other words, it is desirable that beams at the center of the angle of view (beams that exit parallel to the Y direction from the mirror set) enter mirrors of the mirror set at incident angles greater than 45 degrees. With this configuration, beams having greater absolute values of the propagation angles can exit from the side closer to the incident surface 2115 of the horizontal light guide part 21 as effective beams, so a similar advantageous effect to that of the present embodiment is obtained.

In the light guide plate 2 of the present embodiment, the vertical mirror set 222 is disposed between the vertical propagation part 221 and the viewer's eye 5. However, the vertical mirror set 222 may be disposed between the rear surface 2212 of the vertical propagation part 221 and the viewer's eye 5 (that is, on the side where beams exit from the light guide plate 2 away from the rear surface 2212 of the vertical propagation part 221), and a mirror set may be disposed in the vertical propagation part 221. In this case as well, it is desirable that beams finally reflected by the rear surface 2212 of the vertical propagation part 221 be reflected by the mirror set. In other words, it is desirable that beams at the center of the angle of view (a beam that exits parallel to the X direction from the mirror set) enter mirrors of the mirror set at incident angles greater than 45 degrees.

Second Embodiment

Figure 8:
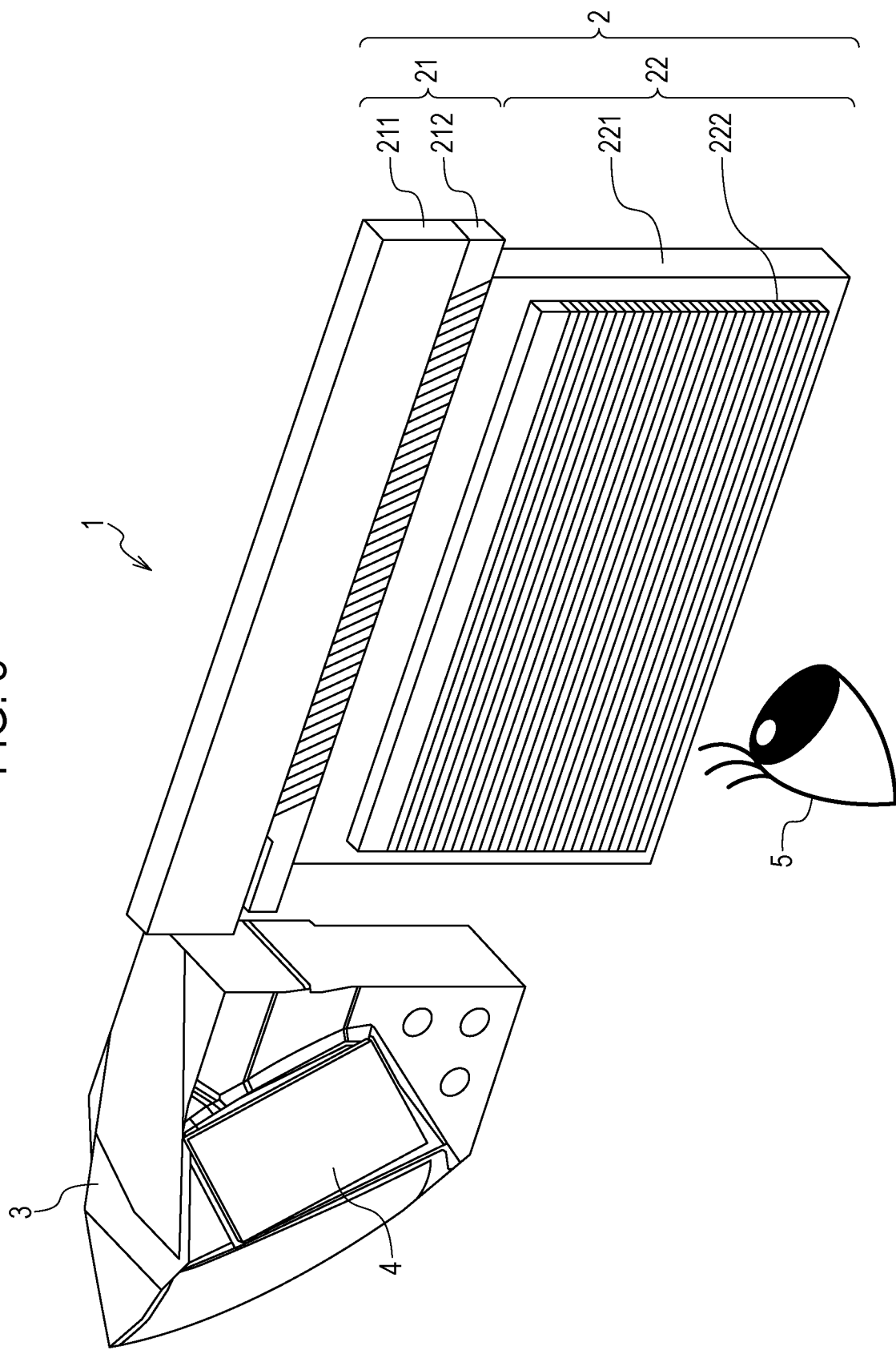
FIG. 8 is a perspective view of a display apparatus of a second embodiment to which the present invention is applicable.

FIG. 8 shows a display apparatus of a second embodiment to which the present invention is applicable.

The present embodiment differs from the first embodiment in that the configurations of the horizontal light guide part 21 and vertical light guide part 22 are modified. Specifically, in the horizontal light guide part 21, the height of the horizontal propagation part 211 is set so as to be greater than that of an aperture stop 33 of the incident optical system 3 for the horizontal light guide part 21 and the transmissive reflection film disposed at the joint surface between the horizontal light guide part 21 and the horizontal mirror set 212 is omitted. In the vertical light guide part 22, the width of the vertical propagation part 221 in the X-axis direction is greater than the width of the horizontal propagation part 211 in the X-axis direction, and the transmissive reflection film disposed at the joint surface between the vertical propagation part 221 and the vertical mirror set 222 is omitted.

Figure 9A:
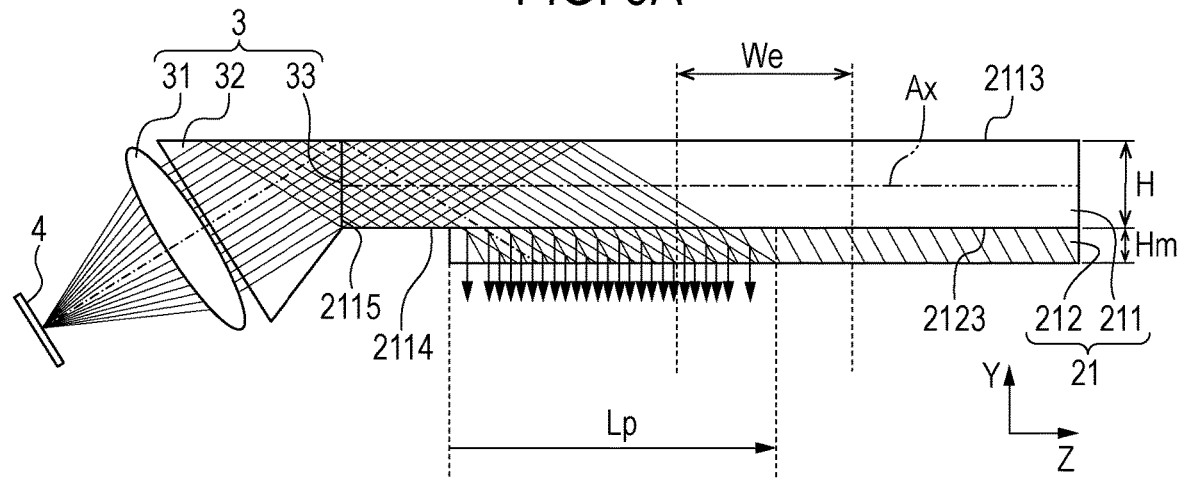
FIG. 9A is a diagram that illustrates a horizontal light guide part of the second embodiment to which the present invention is applicable.
Figure 9B:
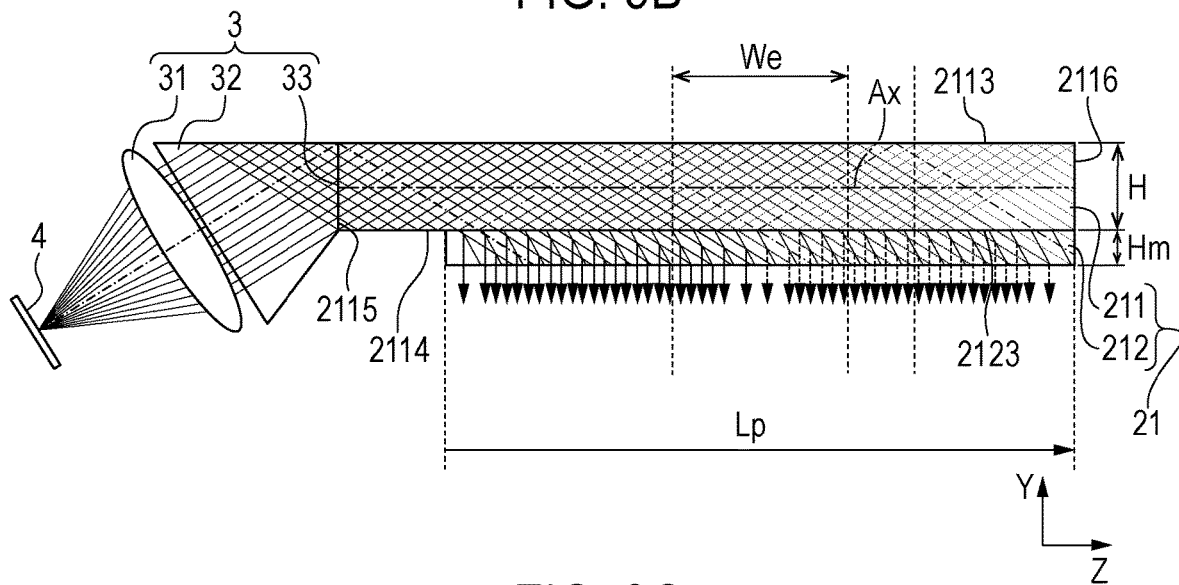
FIG. 9B is a diagram that illustrates the horizontal light guide part of the second embodiment to which the present invention is applicable.
Figure 9C:
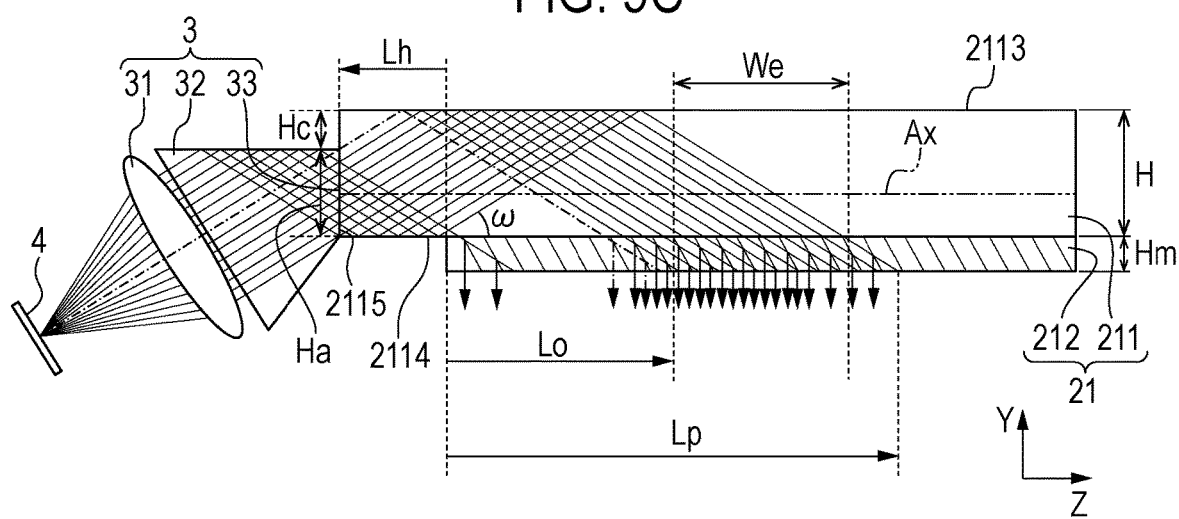
FIG. 9C is a diagram that illustrates the horizontal light guide part according to the second embodiment to which the present invention is applicable.

FIG. 9A and FIG. 9B show horizontal light guide parts of comparative examples. FIG. 9C shows the horizontal light guide part of the present embodiment.

The configuration of the horizontal light guide part in the present embodiment will be described with reference to FIG. 9A, FIG. 9B, and FIG. 9C.

In FIG. 9A, FIG. 9B, and FIG. 9C, the horizontal light guide part 21 made up of the horizontal propagation part 211 and the horizontal mirror set 212, the incident optical system 3 made up of a projection lens 31 and the connection part 32, and the display element 4 are schematically shown.

Beams that exit from pixels of the display element 4 are converted to parallel beams by the projection lens 31 and become beams having angles of view appropriate for pixel positions of the display element 4. The beams coming from the projection lens 31 enter the connection part 32, part of the beams internally reflect at the connection part 32 and reach the joint region 33 joined with the incident surface 2115 of the horizontal propagation part 211, and another part do not internally reflect at the connection part 32 and reach the joint region 33. Thus, two incident beams in a positive direction and a negative direction are formed with respect to the long axis Ax of the horizontal propagation part 211. Each beam enters the horizontal propagation part 211 while the width is limited at the joint region 33 and becomes a propagating beam. In other words, the joint region 33 between the connection part 32 of the incident optical system 3 and the incident surface 2115 of the horizontal propagation part 211 has the function of the aperture stop 33 of the incident optical system 3. In other words, beams limited by the aperture stop 33 of the incident optical system 3 enter the horizontal light guide part 21.

As shown in FIG. 9A, in the comparative example, the entire surface of the left surface 2115 of the horizontal propagation part 211 is used to be joined with the connection part 32 of the incident optical system 3, and the left surface 2115 of the horizontal propagation part 211 has the same size as the aperture stop 33 of the incident optical system 3. Propagating beams having entered from the incident surface 2115 of the horizontal propagation part 211 internally reflect on the top surface 2113 and bottom surface 2114 of the horizontal propagation part 211 and propagate inside the horizontal propagation part 211. At the incident surface 2115 of the horizontal propagation part 211, propagating beams enter in two directions, that is, the positive direction and the negative direction, with respect to the long axis Ax of the horizontal propagation part 211 in the Y-Z direction, so the inside of the horizontal propagation part 211 is filled with propagating beams. Thus, at the bottom surface 2124 of the horizontal mirror set 212, propagating beams are uniformly distributed on the side near the incident surface 2115 of the horizontal propagation part 211.

In the horizontal light guide part 21 of the comparative example of FIG. 9A, no transmissive reflection film is installed at the joint surface between the bottom surface 2114 of the horizontal propagation part 211 and the top surface 2123 of the horizontal mirror set 212, and propagating beams in the horizontal propagation part 211 transmit through the joint surface and enter the horizontal mirror set 212. At this time, propagating beams in the horizontal propagation part 211 propagate a distance Lp from the beginning position of the joint surface between the bottom surface 2114 of the horizontal propagation part 211 and the top surface 2123 of the horizontal mirror set 212, and the propagating beams reach the horizontal mirror set 212 without any gap.

Reference sign We in FIG. 9A denotes a necessary beam region that is used at the center of the angle of view. The necessary beam region is a width equivalent to the pupil diameter of the display apparatus, called EMB, and usually a width of 6 mm to 15 mm is ensured.

However, in the comparative example of FIG. 9A, propagating beams reach part of the necessary beam region We at the position of the bottom surface 2124 of the horizontal mirror set 212. In this situation, beams having a sufficient width do not reach the viewer's eye, and there is a problem that part of an image disappears.

FIG. 9B is a comparative example in which, in the horizontal light guide part 21 of the comparative example of FIG. 9A, a transmissive reflection film is disposed at the joint surface between the bottom surface 2114 of the horizontal propagation part 211 and the top surface 2123 of the horizontal mirror set 212. The first embodiment is also this mode. In this case, part of propagating beams in the horizontal propagation part 211 transmit through the joint surface between the bottom surface 2114 of the horizontal propagation part 211 and the top surface 2123 of the horizontal mirror set 212 and enter the horizontal mirror set 212, and another part reflect and propagate inside the horizontal propagation part 211 again. By repeating this action, propagating beams reach the terminal end 2116 of the horizontal propagation part 211, and propagating beams are distributed over the entire range of the horizontal mirror set 212. Therefore, deflected beams deflected by the horizontal output mirrors 2120 are present in all the necessary beam region We at the center of the angle of view, so beams having a sufficient width reach the viewer's eye. However, the transmissive reflection film is disposed at the joint surface between the bottom surface 2114 of the horizontal propagation part 211 and the top surface 2123 of the horizontal mirror set 212, and reflects only part of propagating beams having entered the transmissive reflection film. For example, when the transmissive reflection film has a transmittance of 25% and a reflectance of 65%, the light quantity of propagating beams decreases by 35% every reflection. Since the number of times of reflection at the transmissive reflection film increases as the propagation distance extends, a light quantity distribution commensurate with the propagation distance occurs in deflected beams that exit from the horizontal light guide part 21, and the light quantity distribution is corrected to a low light quantity part by reducing the light quantity of a high light quantity part. Therefore, a loss in light quantity occurs and becomes problematic.

FIG. 9C shows the horizontal light guide part of the present embodiment.

The horizontal propagation part 211 of the present embodiment is configured such that the height H (width in the Y-axis direction) of the horizontal propagation part 211 is greater by Hc than the height Ha of the aperture stop 33 of the incident optical system 3. The length in the Y-axis direction perpendicular to the bottom surface 2114 (extended surface (described later)) of the horizontal propagation part 211 is greater than once and less than twice the width of the aperture in the Y-axis direction of the aperture stop 33 of the incident optical system 3. In other words, 0<Hc<Ha. The length of the horizontal propagation part 211 in the Y-axis direction corresponds to the distance between two total reflection surfaces (the top surface 2113 and the bottom surface 2114) of the horizontal propagation part 211.

In the comparative examples of FIG. 9A and FIG. 9B, the height H of the horizontal propagation part 211 is Ha.

In the horizontal light guide part 21 of the present embodiment, as in the case of the comparative example of FIG. 9A, beams enter the joint region 33, joined with the connection part 32 at the incident surface 2115 of the horizontal propagation part 211, at angles (±ω) of two positive and negative directions in the Y-Z cross section and become propagating beams. Propagating beams propagate inside the horizontal propagation part 211 while totally reflecting on the bottom surface 2114 and top surface 2113 of the horizontal propagation part 211. The horizontal light guide part 21 of the present embodiment has no transmissive reflection film at the joint surface between the bottom surface 2114 of the horizontal propagation part 211 and the top surface 2123 of the horizontal mirror set 212. For this reason, 90% or higher (more desirably, 95% or higher) propagating beams having entered the exit region of the bottom surface 2114 of the horizontal propagation part 211 transmit through the joint surface and enter the horizontal mirror set 212. Therefore, after propagating beams enter the region in which the horizontal propagation part 211 is joined with the horizontal mirror set 212, the number of times of reflection is only once at the top surface 2113 of the horizontal propagation part 211. Beams are delivered to necessary regions by this number of times of reflection, that is, once.

When one cycle of propagation starts from the bottom surface 2114 of the horizontal propagation part 211, reflects on the top surface 2113 of the horizontal propagation part 211, and reaches the bottom surface 2114 of the horizontal propagation part 211 again, a propagation distance La per one cycle of propagation is given by the conditional expression (5).

$$La = H/\tan \omega \times 2 \qquad \text{Conditional Expression (5).}$$

As expressed by the conditional expression (5), the propagation distance La per one cycle of propagation extends in proportion to the height H of the horizontal light guide part 21.

The horizontal light guide part 21 of the present embodiment is configured such that the height H (the width in the Y-axis direction) of the horizontal propagation part 211 is greater by Hc than the height Ha of the aperture stop 33 of the incident optical system 3, so the propagation distance is extended by 2×Hc/tan ω. Thus, a propagating beam reaches the distal end (the farthest position from the incident surface 2115 of the necessary beam region We) of the necessary beam region We at each angle of view. FIG. 9C shows beams at the center angle of view as an example. With the configuration of the present embodiment, propagating beams are delivered to a position beyond the distal end of the necessary beam region We for the beams at the center angle of view.

To make propagating beams reach the distal end of the necessary beam region We for each angle of view, the height H of the horizontal propagation part 211 may be configured to be greater by Hc than the height Ha of the aperture stop 33 of the incident optical system 3 so that the conditional expression (6) is satisfied.

$$H = Ha + Hc \qquad \text{Conditional Expression (6)}$$

$$Hc \geq \frac{(Lo + We) \times \tan \omega - 2 \times Ha - Hm}{2}.$$

where
H is the height (width in the Y-axis direction) of the horizontal propagation part 211,
Ha is the height of the aperture stop 33 of the incident optical system 3,
Hc is an amount by which the height of the horizontal propagation part 211 is greater than the height of the aperture stop 33 of the incident optical system 3,
Hm is the height of the horizontal mirror set 212,
Lo is a distance from the most incident surface 2115-side position of the joint surface between the horizontal propagation part 211 and the horizontal mirror set 212 to the most incident surface 2115-side position of the necessary beam region We,
We is the width of the necessary beam region, and
ω is a propagation angle.

On the other hand, when the height of the horizontal propagation part 211 is set so as to be greater than the height of the aperture stop 33 of the incident optical system 3, the inside of the horizontal propagation part 211 is not filled with propagating beams. Although there occurs propagating beam gaps where no propagating beams are present in the horizontal propagation part 211, when the propagating beam gaps are configured not to overlap the necessary beam region We at each angle of view, only the above-described advantage is obtained. Even when beams at the center angle of view shown in FIG. 9C are taken as an example, propagating beam gaps are configured not to overlap the necessary beam region We.

For this configuration, the configuration that the region where the height H of the horizontal propagation part 211 is greater by Hc than the height Ha of the aperture stop 33 of the incident optical system 3 is extended toward the connection part 32 beyond the joint surface between the horizontal propagation part 211 and the horizontal mirror set 212 is important. In FIG. 9C, an extended amount is Lh, and beams reflected by the top surface of the connection part 32 of the incident optical system 3 are reflected by the extended surface (the surface disposed between the incident surface 2115 of the horizontal propagation part 211 and the mirror set 212 in the horizontal direction and facing the top surface 2113). Thus, the most leading position (closest to the incident surface 2115 of the horizontal propagation part 211) that propagating beams reach is located before the necessary beam region We.

At each angle of view, to keep propagating beam gaps out of the necessary beam region, the extended amount Lh of a portion of the horizontal propagation part 211 higher by Hc than the aperture stop 33 of the incident optical system 3 may be configured to satisfy the conditional expression (7).

$$Lh \geq \frac{2 \times Hc + Ha + Hm}{\tan \omega} - Lo. \quad \text{Conditional Expression (7)}$$

where
Ha is the height of the aperture stop 33 of the incident optical system 3,
Hc is an amount by which the height of the horizontal propagation part 211 is greater than the height of the aperture stop 33 of the incident optical system 3,
Hm is the height of the horizontal mirror set 212,
Lo is a distance from the most incident surface 2115-side position of the joint surface between the horizontal propagation part 211 and the horizontal mirror set 212 to the most incident surface 2115-side position of the necessary beam region We, and
ω is a propagation angle.

In this way, in the present embodiment, propagating beams at each angle of view are caused to reach the necessary beam region We for the angle of view, and propagating beam gap portions are configured not to overlap the necessary beam region We.

In other words, a configuration that satisfies the conditional expression (6) and the conditional expression (7) at the same time is desirable, and a configuration that the amount Hc by which the height of the horizontal propagation part 211 is greater than the height of the aperture stop 33 of the incident optical system 3 satisfies the conditional expression (8) is desirable.

$$(Lo+We) \times \tan \omega - 2 \times Ha - Hm \leq 2 \times Hc \leq (Lo+Lh) \times \tan \omega - Ha - Hm \quad \text{Conditional Expression (8)}.$$

where
H is the height (width in the Y-axis direction) of the horizontal propagation part 211,
Ha is the height of the aperture stop 33 of the incident optical system 3,
Hm is the height of the horizontal mirror set 212,
Lo is a distance from the most incident surface 2115-side position of the joint surface between the horizontal propagation part 211 and the horizontal mirror set 212 to the most incident surface 2115-side position of the necessary beam region We,
Lh is the extended amount of a portion of the horizontal propagation part 211, which is higher by than the aperture stop 33 of the incident optical system 3,
We is the width of the necessary beam region, and
ω is a propagation angle.

As in the case of the present embodiment, when the height H of the horizontal propagation part 211 of the horizontal light guide part 21 is greater than the height of the aperture stop 33 of the incident optical system 3, propagating beams at each angle of view reach the necessary beam region with a smaller number of times of reflection.

In the present embodiment, the height of the horizontal propagation part 211 of the horizontal light guide part 21 is set so as to be greater by Hc than the height of the aperture stop 33 of the incident optical system 3, and the extended amount Lh of the portion of the horizontal propagation part 211, which is higher by Hc than the aperture stop 33 of the incident optical system 3, is appropriately set. Thus, the configuration that the number of times of reflection at the transmissive reflection surface is zero is achieved, so the display apparatus 1 with a reduced loss in light quantity is achieved. In other words, in the present embodiment, propagating beams having entered the horizontal propagation part 211 are propagated in the horizontal direction by being internally reflected by three or more surfaces of the four surfaces (the front surface 2111, the rear surface 2112, the top surface 2113, and the bottom surface 2114), parallel to the horizontal direction, of the horizontal propagation part 211.

In the comparative example of FIG. 9B, beams at the center of the angle of view are reflected by not only mirrors disposed at a center portion including the necessary beam region We but also mirrors disposed at both end portions, so there is a large loss in light quantity. However, in the present embodiment of FIG. 9C, beams at the center of the angle of view are reflected by only mirrors disposed at the center portion including the necessary beam region We and are not reflected by mirrors disposed at both end portions, so there is a small loss in light quantity.

In the present embodiment, of both ends of the aperture of the aperture stop 33, the lower-side (extended surface-side) one end is disposed at the same level with the bottom surface (extended surface) 2114, and the upper-side (reflection surface-side) other end is disposed below the top surface (reflection surface) 2113. However, of both ends of the aperture stop 33, the upper-side (reflection surface-side) one end may be disposed at the same level with the top surface (reflection surface) 2113, and the lower-side (extended surface-side) other end may be disposed above the bottom surface (extended surface) 2114. However, in this case, the propagation distance can be extended by Hc/tan ω.

Figure 10:
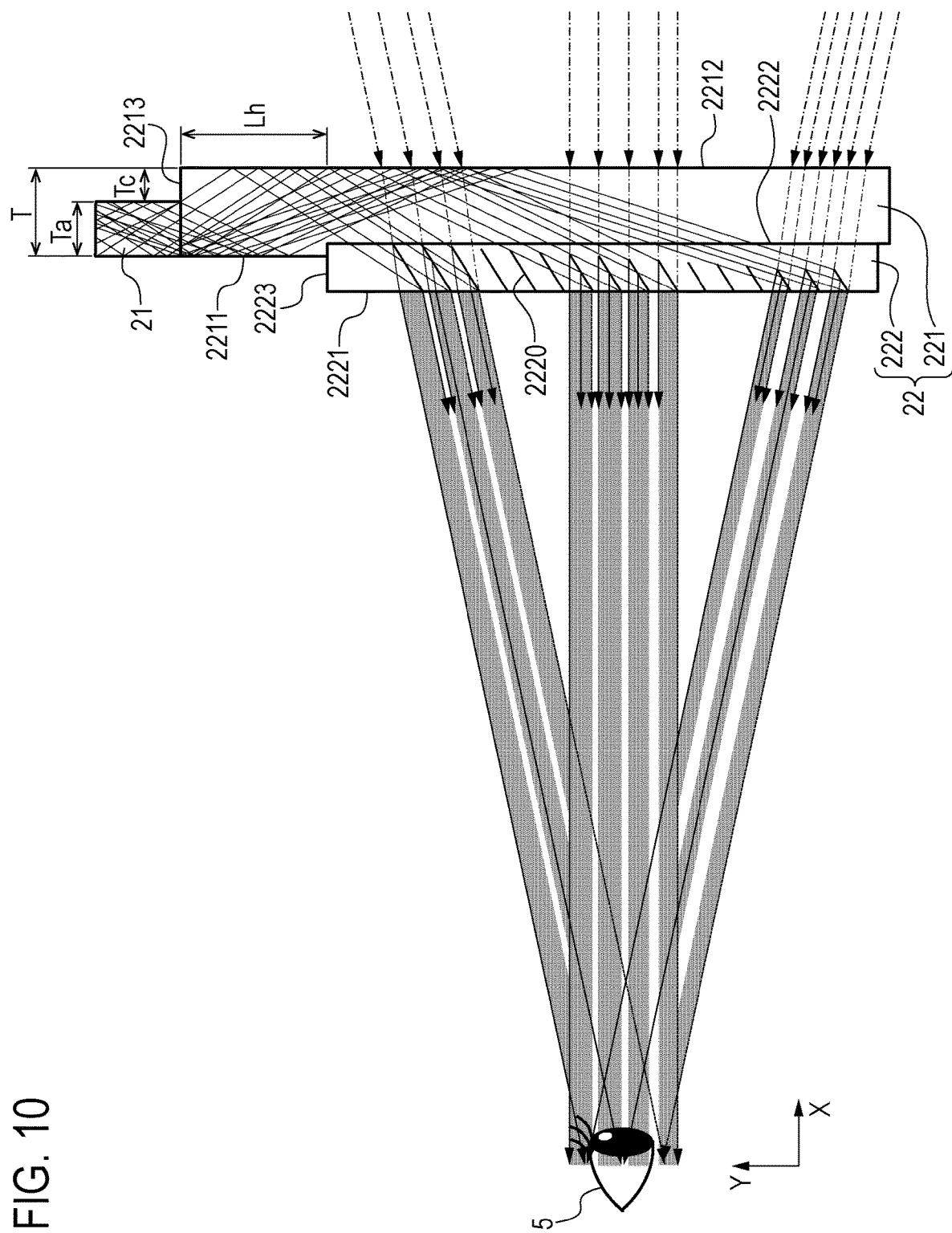
FIG. 10 is a diagram that illustrates a vertical light guide part of the second embodiment to which the present invention is applicable.

FIG. 10 shows the vertical light guide part 22 of the present embodiment.

In the present embodiment as well, the vertical light guide part 22 is made up of the vertical propagation part 221 and the vertical mirror set 222. The vertical mirror set 222 includes the plurality of vertical output mirrors 2220, a wire grid is used as each vertical output mirror 2220, and the wire grids are disposed such that the orientations of the wire grids are rotated by 90 degrees in the adjacent vertical output mirrors 2220. In the present embodiment, as shown in FIG. 10, a step is provided in the vertical propagation part 221, and the vertical mirror set 222 is disposed on the step.

The thickness T (width in the X direction) of the vertical propagation part 221 of the present embodiment is greater than the thickness of the vertical propagation part 221 of the first embodiment. The thickness of the vertical propagation part 221 of the first embodiment is the same as the thickness of the horizontal light guide part 21; however, the thickness T of the vertical propagation part 221 of the present embodiment is greater by Tc than the thickness Ta of the horizontal light guide part 21. Thus, propagating beams in the vertical propagation part 221 totally reflect on the rear surface 2212 of the vertical propagation part 221, then enter the vertical mirror set 222, reflect on the vertical output mirrors 2220 to be deflected, exit from the front surface 2221 of the vertical mirror set 222, and enter the viewer's eye 5.

With an increased thickness of the vertical propagation part 221, propagating beams reach necessary portions where beams are used for angles of view only by totally reflecting once on the rear surface 2212 of the vertical propagation part 221. Thus, propagating beams do not need to be reflected by the joint surface between the vertical propagation part 221 and the vertical mirror set 222, not only a transmissive reflection film is not used but also the vertical propagation part 221 and the vertical mirror set 222 are unified, so cost reduction is achieved.

Third Embodiment

Figure 11A:
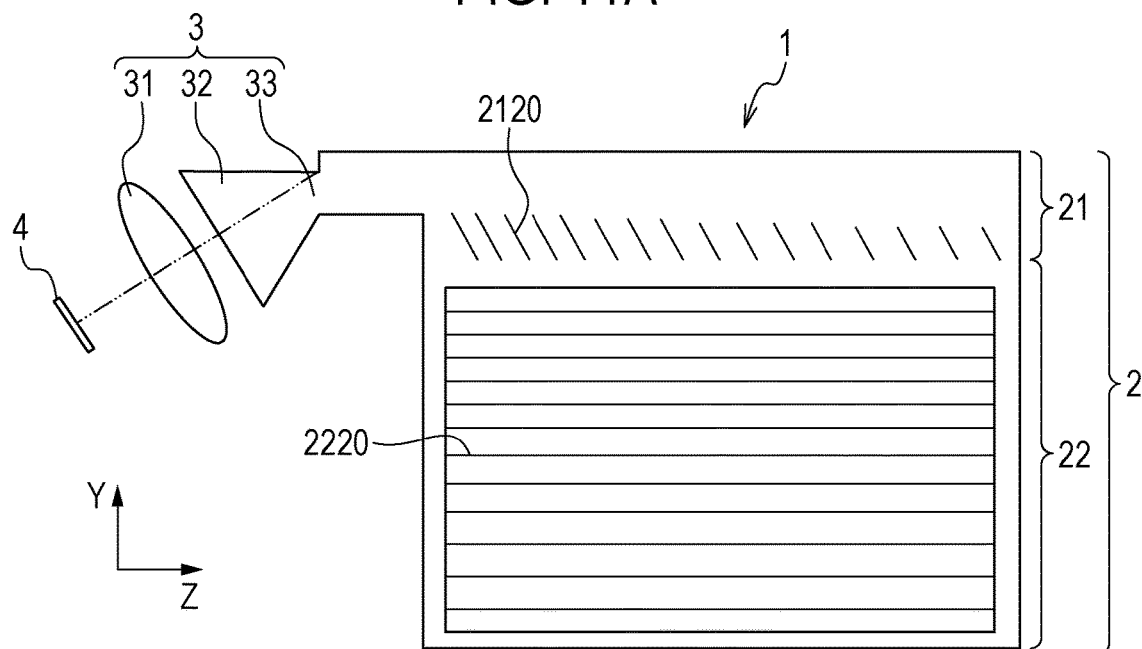
FIG. 11A is a diagram of a display apparatus of a third embodiment to which the present invention is applicable.
Figure 11B:
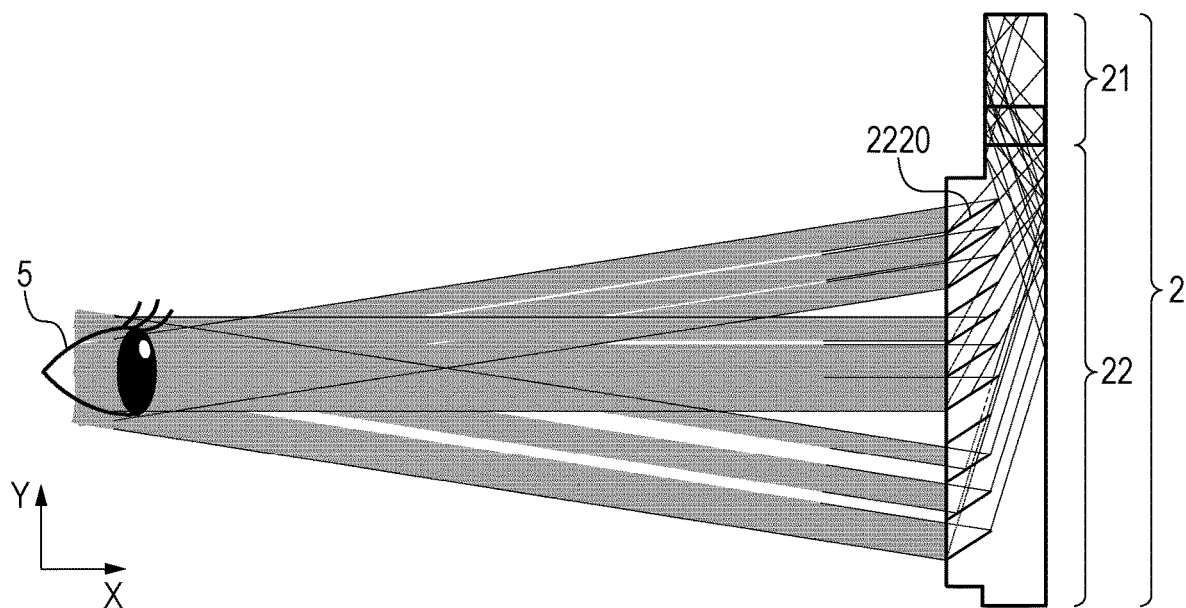
FIG. 11B is a diagram of the display apparatus of the third embodiment to which the present invention is applicable.

FIG. 11A shows a front view of a third embodiment to which the present invention is applicable. FIG. 11B shows a side view.

The present embodiment differs from the second embodiment in that the configurations of the horizontal mirror set and vertical mirror set are modified and the horizontal light guide part 21, the vertical light guide part 22, and the connection part 32 of the incident optical system 3 are unified.

As shown in FIG. 11A, in the present embodiment, the whole of the light guide plate 2 is unified, and the horizontal output mirrors 2120 and the vertical output mirrors 2220 are embedded in a resin molded product. Specifically, the horizontal output mirrors 2120 and the vertical output mirrors 2220 are made from glass, then put in a die, and the light guide plate 2 is molded from resin so as to cover the outer sides of the mirrors 2120, 2220. This is so-called glass insert molding. Therefore, there is no definite boundary between the horizontal propagation part 211 of the horizontal light guide part 21 and the horizontal mirror set 212 unlike the second embodiment, and the output mirrors may be disposed near the propagation part within the range in which the output mirrors do not come into contact with propagating beams that have not reached predetermined output positions.

In the present embodiment, the height of each output mirror is changed portion by portion, and the interval (pitch) between any adjacent output mirrors is also changed, so further flexible arrangement is possible. The interval of the output mirrors increases with a distance from the incident surface 2115 of the horizontal light guide part 21. Thus, gaps in deflected beams coming from the output mirrors are reduced, and deflected beams having a further uniform light quantity distribution are caused to enter the viewer's eye, so a high-grade image is displayed.

The light guide plate 2 of the present embodiment also includes the horizontal light guide part 21 that guides light coming from the incident optical system 3 in the Z-axis direction and the vertical light guide part 22 that guides the light in the Y-axis direction. The horizontal light guide part 21 includes the horizontal mirror set 212. The horizontal light guide part 21 reflects beams propagating inside the horizontal light guide part 21 with the horizontal mirror set 212 and guides the beams to the vertical light guide part 22.

As in the case of the second embodiment, the incident surface 2115 of the horizontal light guide part 21 serves as the aperture stop 33 of the incident optical system 3. In addition, a distance in the Y-axis direction between two total reflection surfaces of the horizontal light guide part 21 is set so as to be longer than one and less than twice the aperture width in the Y-axis direction of the aperture stop 33.

As shown in FIG. 11B, the vertical light guide part 22 includes the vertical mirror set 222, deflects beams propagating inside the vertical light guide part 22 in the X-axis direction by reflecting the beams with the vertical output mirrors 2220, and causes the beams to exit from the vertical light guide part 22 toward the viewer's eye 5.

In the present embodiment, both the height and interval of the plurality of output mirrors are changed. Alternatively, when only the interval of the plurality of output mirrors is changed, gaps in deflected beams are reduced.

A human's eye turns its eyeball when views a different angle of view. On the other hand, there are gaps in deflected beams that exit from a light guide plate, and the position and size of each gap vary depending on the angle of view.

When there are large gaps in beams that enter the viewer's eye, the light quantity of beams that enter the pupil of the eye changes, so, even when an image having a uniform brightness is viewed, the image looks as bright parts and dark parts are dotted. A display image having such quality that cannot be regarded as a good field of view as if a scene is seen through a wire screen.

On the other hand, in the display apparatuses 1 of the first third embodiments, gaps in beams that enter the viewer's eye at all the angles of view are narrowed, so differences between bright parts and dark parts at each angle of view reduce and are reduced to such a degree that the viewer is not annoyed. Thus, the display apparatuses are able to constantly display good images.

The display apparatuses 1 of the first to third embodiments may be applied to, for example, a head mounted display (including smartglasses, AR glasses, a scouter, and the like), a head-up display, a cellular phone display, a 3D display, and the like.

Fourth Embodiment

In the present embodiment, the display apparatus of the present invention is applied to smartglasses that are one example of a head mounted display.

Figure 12:
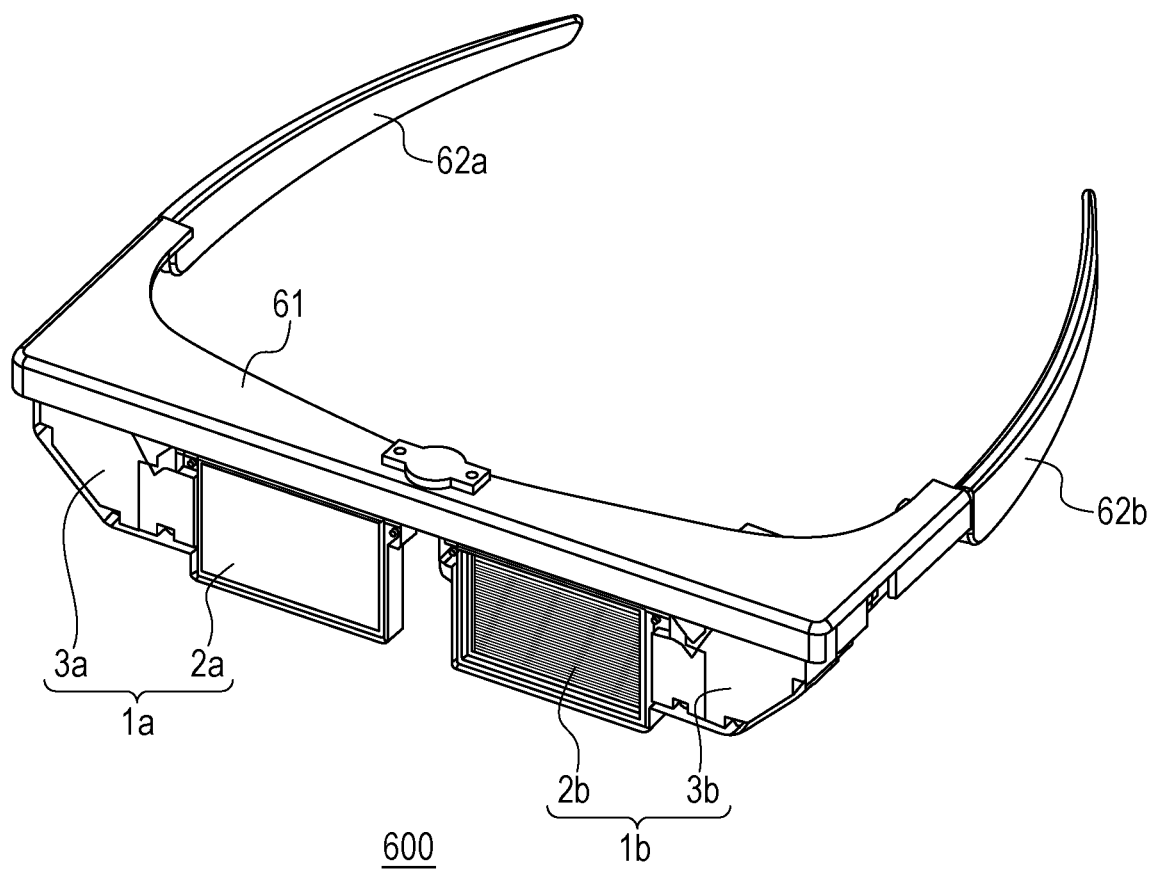
FIG. 12 is a perspective view of smartglasses of a fourth embodiment to which the present invention is applicable.

FIG. 12 is a perspective view of the smartglasses 600 of the fourth embodiment to which the present invention is applicable.

The smartglasses 600 are a spectacle-type wearable terminal and is a terminal for so-called augmented reality (AR), which displays an actually viewing real world with various pieces of information added.

The smartglasses 600 include a frame and two display apparatus 1a and display apparatus 1b. The frame includes a rim 61, a temple 62a, and a temple 62b. The display apparatus 1a and the display apparatus 1b are joined with the bottom surface of the rim 61. The temple 62a and the temple 62b are respectively joined with both sides of the rim 61. The display apparatus of any one of the first to third embodiments may be used as each of the display apparatus 1a and the display apparatus 1b.

Light from the display element (not shown) of the display apparatus 1a is guided by the incident optical system 3a and the light guide plate 2a to the right eye of a viewer who wears the smartglasses 600, and an image is seen by the right eye of the viewer. Similarly, light from the display element (not shown) of the display apparatus 1b is guided by the incident optical system 3b and the light guide plate 2b to the left eye of the viewer who wears the smartglasses 600, and an image is seen by the left eye of the viewer.

In the smartglasses 600 of the present embodiment, the direction in which the right and left eyes of the viewer are arranged coincides with the horizontal direction (first direction) in which the horizontal light guide part 21 propagates beams, and the direction perpendicular to the rim 61 coincides with the vertical direction (second direction) in which the vertical light guide part 22 propagates beams. With this configuration, the longitudinal direction of the mirrors of the vertical mirror set coincides with the direction in which the eyes of the viewer are arranged, so the visibility of the vertical mirror set of the viewer is reduced.

With the smartglasses of the present embodiment, a high-quality image having a wide angle of view is displayed for a viewer who wears the smartglasses.

The embodiments of the present invention are described above; however, the present invention is not limited to these embodiments. Various modifications and changes are possible within the scope of the present invention.

For example, in the display apparatuses of the first to third embodiments, the display apparatus that expands the width of each beam in two-dimensional directions is described. Alternatively, the configuration of the horizontal mirror set or vertical mirror set of the first embodiment may be applied to a mirror set of a display apparatus that expands the width of each beam in one-dimensional direction or the configuration of the horizontal propagation part or vertical propagation part of the second embodiment may be applied to a propagation part of a display apparatus that expands the width of each beam in one-dimensional direction. Furthermore, the configuration of the mirror set of the third embodiment or the concept of unification of the third embodiment may be applied to a propagation part of a display apparatus that expands the width of each beam in one-dimensional direction.

According to the present invention, a display apparatus that expands the width of a beam in two-dimensional directions with a reduced light quantity loss is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display apparatus comprising:
a light guide element; and
a projection lens configured to cause light coming from a display or a spatial light modulator to enter the light guide element, wherein
the light guide element includes a first light guide part configured to guide the light coming from the projection lens in a first direction and a second light guide part configured to guide the light coming from the first light guide part in a second direction intersecting with the first direction,
the first light guide part has a first mirror set configured to guide the light to the second light guide part by reflecting the light,
the second light guide part has a second mirror set configured to output the light in a third direction from the light guide element by reflecting the light, the third direction intersects with the first direction and the second direction,
the first light guide part has a first reflection surface facing the first mirror set,
the second light guide part has a second reflection surface facing the second mirror set,
the projection lens is configured to cause the light coming from the display or the spatial light modulator to enter the first light guide part obliquely with respect to the second and third directions such that the light is reflected by the first reflection surface of the first light guide part and the second reflection surface of the second light guide part, and
the first mirror set is disposed between the first reflection surface and the second light guide part.

2. The display apparatus according to claim 1, wherein the first mirror set is configured to guide the light to the second light guide part by reflecting the light finally reflected by the first reflection surface.

3. The display apparatus according to claim 1, wherein the first mirror set includes a plurality of mirrors, and
each of the plurality of mirrors is disposed such that a beam at a center of an angle of view of the light enters each of the plurality of mirrors at an incident angle greater than 45 degrees.

4. The display apparatus according to claim 1, wherein the first light guide part has a first propagation part configured to propagate the light in the first direction, and
the first mirror set is disposed between the first propagation part and the second light guide part.

5. The display apparatus according to claim 4, wherein the first mirror set and the second light guide part are joined with each other.

6. The display apparatus according to claim 1, wherein the second mirror set is disposed on a side in the third direction with respect to the second reflection surface.

7. The display apparatus according to claim 1, wherein the second mirror set is configured to output the light from the light guide element by reflecting the light finally reflected by the second reflection surface.

8. The display apparatus according to claim 1, wherein the second mirror set includes a plurality of mirrors, and each of the plurality of mirrors is disposed such that a beam at a center of an angle of view of the light enters each of the plurality of mirrors at an incident angle greater than 45 degrees.

9. The display apparatus according to claim 1, wherein
the second light guide part has a second propagation part configured to propagate the light in the second direction, and
the second mirror set is disposed on a side in the third direction with respect to the second propagation part.

10. The display apparatus according to claim 1, wherein
the first light guide part has a first propagation part configured to propagate the light in the first direction, and
an absolute value of a propagation angle ω of the light in the first propagation part satisfies a conditional expression, 10 degrees≤ω≤50 degrees.

11. The display apparatus according to claim 1, wherein the number of mirrors of the first mirror set is greater than the number of mirrors of the second mirror set.

12. The display apparatus according to claim 1, wherein
the light having entered the first light guide part is guided in the first direction by being reflected by three or more surfaces of four surfaces, parallel to the first direction, of the first light guide part, and
the light having entered the second light guide part is guided in the second direction by being reflected by two or less surfaces of four surfaces, parallel to the second direction, of the second light guide part.

13. The display apparatus according to claim 1, wherein a light shielding part is disposed in each of three surfaces, parallel to the third direction, of the second light guide part.

14. A head mounted display comprising:
a display apparatus; and
a frame, wherein
the display apparatus includes a light guide element, and a projection lens configured to cause light coming from a display or a spatial light modulator to enter the light guide element,
the light guide element includes a first light guide part configured to guide the light coming from the projection lens in a first direction and a second light guide part configured to guide the light coming from the first light guide part in a second direction intersecting with the first direction, the first light guide part has a first mirror set configured to guide the light to the second light guide part by reflecting the light,
the second light guide part has a second mirror set configured to output the light in a third direction from the light guide element by reflecting the light, the third direction intersects with the first direction and the second direction,
the first light guide part has a first reflection surface facing the first mirror set,
the second light guide part has a second reflection surface facing the second mirror set,
the projection lens is configured to cause the light coming from the display or the spatial light modulator to enter the first light guide part obliquely with respect to the second and third directions such that the light is reflected by the first reflection surface of the first light guide part and the second reflection surface of the second light guide part, and
the first mirror set is disposed between the first reflection surface and the second light guide part.

15. The head mounted display according to claim 14, wherein the first direction coincides with a direction in which viewer's eyes are arranged.

16. The head mounted display according to claim 14, wherein a longitudinal direction of mirrors of the second mirror set coincides with a direction in which viewer's eyes are arranged.

* * * * *